United States Patent
Fischer

(10) Patent No.: US 8,634,856 B2
(45) Date of Patent: Jan. 21, 2014

(54) IDENTIFYING NEIGHBORS OF GEO-SPATIALLY DISTRIBUTED RADIO TRANSMITTERS

(75) Inventor: Markus Fischer, Los Altos, CA (US)

(73) Assignee: Apple Inc., Cupertino, CA (US)

(*) Notice: Subject to any disclaimer, the term of this patent is extended or adjusted under 35 U.S.C. 154(b) by 1134 days.

(21) Appl. No.: 12/579,376

(22) Filed: Oct. 14, 2009

(65) Prior Publication Data

US 2011/0084881 A1  Apr. 14, 2011

(51) Int. Cl.
*H04W 4/02* (2009.01)
(52) U.S. Cl.
USPC ............................. 455/456.3; 370/331
(58) Field of Classification Search
USPC ......... 370/255, 331; 455/456.1, 456.2, 456.3, 455/456.5, 456.6; 342/451, 463–465
IPC .... G06F 17/30241; H04W 24/02,64/003; G01S 5/0242
See application file for complete search history.

(56) References Cited

U.S. PATENT DOCUMENTS

| 2004/0198386 A1 | 10/2004 | Dupray |
| 2007/0281689 A1 | 12/2007 | Altman et al. |
| 2009/0003279 A1* | 1/2009 | Abusch-Magder et al. .. 370/331 |
| 2009/0052350 A1* | 2/2009 | Chen et al. .................... 370/255 |
| 2010/0056178 A1* | 3/2010 | Kreher et al. .............. 455/456.1 |

FOREIGN PATENT DOCUMENTS

EP  624859 B1  11/1998

OTHER PUBLICATIONS

Harris, Selwa, Authorized Officer, European Patent Office, PCT Application No. PCT/US2010/052513, Filed Oct. 13, 2010, in International Search Report and Written Opinion, mailed Feb. 21, 2011, 17 pages.
Perusco L et al: "Humancentric Applications of Precise Location Based Services", Oct. 12, 2005, E-Business Enginering, 2005. ICEBE 2005. IEEE, Intenrational Conference on Beijing, China Oct. 12-18, 2005, Piscataway, NJ, IEEE, US, pp. 409-418, XP010860488, ISBN: 978-0-7695-2430-6 the whole document.

\* cited by examiner

*Primary Examiner* — Jack W Keith
*Assistant Examiner* — Fred H Mull
(74) *Attorney, Agent, or Firm* — Fish & Richardson P.C.

(57) ABSTRACT

Processes and systems are presented, for identifying a set of neighbors of a radio transmitter based on available geo-spatial coordinates of radio transmitters in operation around the world. In one aspect, the identified set of radio transmitters can be have a desired size (in terms of number of neighbors and/or radial range). The identified set of radio transmitters can be further customized to include radio transmitters of a specific type, and/or radio transmitters that belong to specific network carriers, and/or other possible grouping criteria.

20 Claims, 15 Drawing Sheets

| No. | ID | lat | long | next1 up | prev1 up | next2 down | prev2 down | dist. | neig1 | neig2 | neig3 | neig4 | neig5 | neig6 | neig7 |
|---|---|---|---|---|---|---|---|---|---|---|---|---|---|---|---|
| 0 | 310.410.5061.25095 | 124.14663029 | 241.18322974 | -1 | -1 | -1 | -1 | 50000 | -1 | -1 | -1 | -1 | -1 | -1 | ... |
| 1 | 310.410.5061.4035 | 124.14650631 | 241.25225433 | -1 | -1 | -1 | -1 | 50000 | -1 | -1 | -1 | -1 | -1 | -1 | ... |
| 2 | 310.410.5062.13830 | 124.19908039 | 241.43615133 | -1 | -1 | -1 | -1 | 50000 | -1 | -1 | -1 | -1 | -1 | -1 | ... |
| 3 | 310.410.5061.24251 | 124.20450574 | 241.01511098 | -1 | -1 | -1 | -1 | 50000 | -1 | -1 | -1 | -1 | -1 | -1 | ... |
| 4 | 310.410.5062.15033 | 124.27100600 | 241.48825185 | -1 | -1 | -1 | -1 | 50000 | -1 | -1 | -1 | -1 | -1 | -1 | ... |
| 5 | 310.410.5062.35241 | 124.20596296 | 241.46531695 | -1 | -1 | -1 | -1 | 50000 | -1 | -1 | -1 | -1 | -1 | -1 | ... |
| 6 | 310.410.5062.37186 | 124.21588774 | 241.43877333 | -1 | -1 | -1 | -1 | 50000 | -1 | -1 | -1 | -1 | -1 | -1 | ... |
| 7 | 310.410.5062.2567 | 124.27146769 | 241.45735085 | -1 | -1 | -1 | -1 | 50000 | -1 | -1 | -1 | -1 | -1 | -1 | ... |
| 8 | 310.410.5062.4077 | 124.25230259 | 241.46586204 | -1 | -1 | -1 | -1 | 50000 | -1 | -1 | -1 | -1 | -1 | -1 | ... |
| 9 | 310.410.5063.475 | 124.44063151 | 241.62777537 | -1 | -1 | -1 | -1 | 50000 | -1 | -1 | -1 | -1 | -1 | -1 | ... |
| 10 | 310.410.5063.14633 | 124.22723359 | 241.55830046 | -1 | -1 | -1 | -1 | 50000 | -1 | -1 | -1 | -1 | -1 | -1 | ... |
| 11 | 310.410.5063.2581 | 124.26411611 | 241.78681332 | -1 | -1 | -1 | -1 | 50000 | -1 | -1 | -1 | -1 | -1 | -1 | ... |
| 12 | 310.410.5064.11221 | 124.05841416 | 241.64230180 | -1 | -1 | -1 | -1 | 50000 | -1 | -1 | -1 | -1 | -1 | -1 | ... |
| 13 | 310.410.5063.2501 | 124.23272973 | 241.72827643 | -1 | -1 | -1 | -1 | 50000 | -1 | -1 | -1 | -1 | -1 | -1 | ... |
| 14 | 310.410.5063.2583 | 124.27958703 | 241.57539016 | -1 | -1 | -1 | -1 | 50000 | -1 | -1 | -1 | -1 | -1 | -1 | ... |
| 15 | 310.410.5063.2586 | 124.24095432 | 241.56277128 | -1 | -1 | -1 | -1 | 50000 | -1 | -1 | -1 | -1 | -1 | -1 | ... |
| 16 | 310.410.5063.2585 | 124.27522391 | 241.59453064 | -1 | -1 | -1 | -1 | 50000 | -1 | -1 | -1 | -1 | -1 | -1 | ... |
| 17 | 310.410.5063.2506 | 124.23527765 | 241.70824148 | -1 | -1 | -1 | -1 | 50000 | -1 | -1 | -1 | -1 | -1 | -1 | ... |
| 18 | 310.410.5063.2505 | 124.23183900 | 241.75131623 | -1 | -1 | -1 | -1 | 50000 | -1 | -1 | -1 | -1 | -1 | -1 | ... |
| 19 | 310.410.5063.2547 | 124.28178978 | 241.62880127 | -1 | -1 | -1 | -1 | 50000 | -1 | -1 | -1 | -1 | -1 | -1 | ... |
| 20 | 310.410.5063.2545 | 124.26208826 | 241.70779066 | -1 | -1 | -1 | -1 | 50000 | -1 | -1 | -1 | -1 | -1 | -1 | ... |
| 21 | 310.410.5063.2546 | 124.27642423 | 241.61596629 | -1 | -1 | -1 | -1 | 50000 | -1 | -1 | -1 | -1 | -1 | -1 | ... |
| 22 | 310.410.5063.2587 | 124.30612230 | 241.56663166 | -1 | -1 | -1 | -1 | 50000 | -1 | -1 | -1 | -1 | -1 | -1 | ... |
| 23 | 310.410.5063.2582 | 124.26324672 | 241.57478952 | -1 | -1 | -1 | -1 | 50000 | -1 | -1 | -1 | -1 | -1 | -1 | ... |
| 24 | 310.410.5063.2502 | 124.23446733 | 241.71160191 | -1 | -1 | -1 | -1 | 50000 | -1 | -1 | -1 | -1 | -1 | -1 | ... |
| 25 | 310.410.5063.2565 | 124.23620141 | 241.47562265 | -1 | -1 | -1 | -1 | 50000 | -1 | -1 | -1 | -1 | -1 | -1 | ... |
| 26 | 310.410.5063.25001 | 124.22186488 | 241.52639866 | -1 | -1 | -1 | -1 | 50000 | -1 | -1 | -1 | -1 | -1 | -1 | ... |
| 27 | 310.410.5063.25361 | 124.25106877 | 241.48008082 | -1 | -1 | -1 | -1 | 50000 | -1 | -1 | -1 | -1 | -1 | -1 | ... |

Record array after loading

500B-1

| lat\long | ... | 123.5 | 124.0 | 124.5 | 125.0 | ... | 241 | ... | 360 | ... |
|---|---|---|---|---|---|---|---|---|---|---|
| ... | | | | | | | | | | |
| 123.5 | | | | | | | -1 | | -1 | |
| 124.0 | | | | | | | -1 | | -1 | |
| 124.5 | | | | | | | -1 | | -1 | |
| 125.0 | | | | | | | -1 | | -1 | |
| ... | | | | | | | | | | |

2-D pointer array after initializing

Record array after closing loops
500D-1

2-D pointer array after closing loops
500D-2

Record array after neighbor calculation

500E

IDENTIFYING NEIGHBORS OF GEO-SPATIALLY DISTRIBUTED RADIO TRANSMITTERS

BACKGROUND

This specification relates to identifying neighbors of geo-spatially distributed radio transmitters, for example, cell towers in mobile telecommunications network.

Carriers that rely on radio-frequency signals to transmit information operate networks of radio transmitters. The carriers can identify each radio transmitter by unique identifiers including the geo-spatial coordinates (e.g., latitude and longitude) of the radio transmitter location. The carriers manage information relating to the radio transmitters that they operate, and also, the carriers can share/combine information relating to their respective radio transmitters with other carriers to comply with agreements between carriers, or to conform to various national and international regulations. Accordingly, an international-governed data repository stores information relating to the geo-spatial (latitude and longitude) coordinates of each radio transmitter in operation world-wide. Such a record may include, for example, entries corresponding to over 15 million cell towers operating around the globe.

To satisfy increased demand for an ever-growing number of subscribers who demand and use increasing communication capacity and bandwidth, the carriers can deploy numerous new radio transmitters. Some of the newly deployed radio transmitters can be installed in (usually urban) areas that already have a large spatial density of radio transmitters. Some other of the newly deployed radio transmitters can be installed in sub-urban or rural areas that have a sparse density of radio transmitters, or no radio transmitters at all. While the addition of new radio transmitters is usually prevalent, carriers can also remove radio transmitters from some locations, either because upgrading an obsolete transmitter at the respective location is not possible due to space, power and/or regulation limitations, or because extending or renewing contractual agreements with owners of the respective radio transmitter locations cannot be achieved. The addition or removal of radio transmitters anywhere around the world can be reported to the above-mentioned international-governed data repository. Thus, the record—containing information relating to the geo-spatial (latitude and longitude) coordinates of each radio transmitter in operation world-wide and maintained at the international-governed data repository—can be updated to reflect the addition and/or removal of radio transmitters.

Portions of the foregoing record can be used, for example, to provide location based services (LBS). If the geo-spatial coordinates of three cell towers are provided to a cell phone, the relative strength of the signals from the three cell towers detected by the cell phone can be used for triangulating the instant position of the cell phone. Moreover, the cell phone can continue to track its instant location for as long as the cell phone can detect signals from the three cell towers. Multiple LBS can be provided to a cell phone based on its known geographical location, such as promotions, news and emergency notifications.

SUMMARY

This specification describes processes and systems for identifying a set of neighbors of a radio transmitter based on available geo-spatial coordinates of radio transmitters in operation around the world.

In general, one innovative aspect of the subject matter described in this specification can be implemented in methods that include the actions of receiving from a central source updates about geographically distributed radio transmitters. Responsive to the received updates, an associated set of neighbors can be generated for each of the geographically distributed radio transmitters. The associated set of neighbors of a radio transmitter includes up to a predetermined number of geographically-closest neighboring radio transmitters of the radio transmitter. Also, each radio transmitter of the associated set of neighbors of the radio transmitter is located up to a predetermined geographical-distance away from the radio transmitter. Upon request from a mobile device in communication with a given radio transmitter, geo-spatial coordinates for each of a generated set of neighbors associated with the given radio transmitter can be provided to the mobile device to facilitate location-based services (LBS).

Generating the associated set of neighbors for each of the geographically distributed radio transmitters involves receiving a data-set including geo-spatial coordinates for each of the geographically distributed radio transmitters. The geographically distributed radio transmitters can be grouped in latitude-bins such that each latitude-bin is centered on an associated latitude, has an identical latitude-angle range, and overlaps half of a next latitude-bin to the North and half of a next latitude-bin to the South. For each radio transmitter from each latitude-bin, a set of neighbors of a radio transmitter from a latitude-bin can be generated. The radio transmitter is also from another latitude-bin, and each of the generated set of neighbors is from among radio transmitters, located in either of the latitude-bin and the other latitude-bin, that are separated from the radio transmitter by a longitude-distance shorter than the predetermined geographical-distance. The longitude-distance between a first and second radio transmitters is measured, along a line of latitude of the latitude-bin, between a longitude line of the first radio transmitter and a longitude line of the second radio transmitter.

Generating the set of neighbors of the radio transmitter involves sorting radio transmitters from the latitude-bin by longitude-distance to the radio transmitter. The set of neighbors of the radio transmitter can be built such that radio transmitters included in the built set of neighbors are from the sorted latitude bin. Radio transmitters in the other latitude-bin can be sorted by longitude-distance to the radio transmitter. The built set of neighbors can be updated such that the radio transmitters included in the updated set of neighbors are either from the sorted latitude-bin or from the other sorted latitude-bin.

Building the set of neighbors of the radio transmitter involves selecting a next radio transmitter from the sorted latitude-bin. Responsive to a longitude-distance between the radio transmitter and the selected radio transmitter being shorter than a maximum distance between the radio transmitter and anyone of the set of neighbors, a geographical distance can be calculated between the selected radio transmitter and the radio transmitter. Further responsive to the calculated distance being shorter that the maximum distance, and responsive to the set of neighbors having fewer that a predetermined number of radio transmitters, the selected radio transmitter can be added to the set of neighbors. Furthermore responsive to the calculated distance being less that the maximum distance, and responsive to the set of neighbors having the predetermined number of radio transmitters, eliminating from the set of neighbors a radio transmitter corresponding to the maximum distance prior to adding the selected radio transmitter to the set of neighbors. Additionally, responsive to the longitude-distance between the radio transmitter and the selected radio transmitter being longer than the maximum distance, providing the set of neighbors for the radio transmitter. The selected radio transmitter can be tagged, and later skipped upon identification of the tag.

In another aspect, the described subject matter can also be implemented in a system including a user device and one or more computers operable to interact with the device. The system further includes a set of geographically distributed assets of known latitude and longitude, and a specified geographic location. The one or more computers are further operable to provide to the user device a subset of the set of assets. The subset includes assets located within a predetermined radial-distance from the specified location. The one or more computers are configured to group assets from the set of geographically distributed assets in latitude-bins. Each latitude-bin having a width equal to twice the predetermined radial-distance, and overlapping half of a next-to-the-North latitude-bin and half of a next-to-the-South latitude-bin. The one or more computers are also configured to sort the assets, in two latitude-bins containing the specified location, by longitude-distance to the specified location. For each sorted asset having the longitude-distance to the specified location shorter than the predetermined radial-distance, the one or more computers can calculate a geographical-distance to the specified location, and can add to the subset an asset having the calculated geographical-distance to the specified location shorter than the predetermined radial-distance.

In some implementations, after sorting the assets as described above, for each sorted asset having the longitude-distance to the specified location shorter than a maximum distance for the subset, the one or more computers can calculate a geographical-distance to the specified location. The maximum distance for the subset is equal to the predetermined radial-distance, if the predetermined number of assets has not been reached. And a geographical-distance corresponding to an asset of the subset that is located farthest from the specified location, if the predetermined number of assets has been reached. The one or more computers can add to the subset, an asset having the calculated geographical-distance shorter than the maximum distance for the subset. Responsive to the predetermined number of assets having been reached, remove from the subset the asset that is located farthest from the specified location.

The one or more computers can include a server operable to interact with the device through a data communication network, and the device is operable to interact with the server as a client. Further, the device can be a mobile telephone configured to request from the server the subset of assets located within a predetermined radial-distance from the specified location. Furthermore, the one or more computers can be one computer, the device is a user interface device, and the one computer contains the user interface device.

Additionally, the set of geographically distributed assets can include radio transmitters. The radio transmitters include cell tower transmitters. Alternatively, the radio transmitters include one or more of Wireless Fidelity (WiFi) and Worldwide Interoperability for Microwave Access (WiMAX) transmitters. However, the radio transmitters can included both cell tower transmitters and one or more of wifi and WIMAX transmitters.

In an additional aspect, the described subject matter can also be implemented in a computer-implemented method for searching waypoints that includes (a) receiving a set of waypoints, each waypoint having associated latitude and longitude values. The received set of waypoints can be (b) ordered along lines of latitude, sorted by longitude values. The lines of latitude can be (c) closed by linking the highest and lowest longitude value waypoints per latitude line. Each one of the set of waypoints can be (d) examined starting at a reference waypoint on a line of latitude and moving away from the reference waypoint through longitude values. During the examination, (e) ascending and descending along the lines of latitude and calculating a geographical-distance between the reference waypoint and an examined neighboring waypoint. Examination can be (f) stopped and a set of neighbors of the reference waypoint can be provided when a last examined waypoint is closer than a next waypoint in latitude-distance, either ascending or descending, such that the set of neighbors comprises the examined waypoints. Steps (d-f) can be (g) repeated for all of the set of waypoints along the lines of latitude, for all the lines of latitude.

Particular aspects of the subject matter described in this specification can be implemented so as to realize one or more of the following advantages. The process disclosed in this specification can reduce the computational resources needed to determine distances between geographically distributed radio transmitters by replacing calculations performed in two dimensions (2D) with calculations performed in one dimension (1D). For example, while the 2D distance calculations involve computationally intensive multiplications and square root operations, the 1D distance calculations involve computationally less intensive operations, such as sorting and grouping of arrays, followed by addition operations.

Further, the processes disclosed here can speed up generation of an associated set of neighbors for each of a large number of geographically distributed radio transmitters in a scalable manner. For example, if the radio transmitters of interest are part of the worldwide cell phone network, the number of cell towers in operation worldwide may exceed 15 million. Further, the number of radio transmitters may be in the hundreds of millions for Wireless Fidelity (WiFi) and/or Worldwide Interoperability for Microwave Access (WiMAX) networks. The processes and systems disclosed in this specification can be applied to, and can scale efficiently for, either of the foregoing and/or other radio-based communication networks.

The processes and systems described here can also be implemented as part of a fully customizable solution/service for providing geo-spatial coordinates of a set of radio transmitters located in a given geographical area. For example, the provided set of radio transmitters can be customized to have a desired size (in terms of number of neighbors and/or radial range). The provided set of radio transmitters can be further customized to include radio transmitters of a specific type, and/or radio transmitters that belong to specific network carriers, and/or other possible grouping criteria.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A-5E show aspects of an example implementation of a process for generating neighbor information for given geo-spatially distributed radio transmitters.

Like reference numbers and designations in the various drawings indicate like elements.

DETAILED DESCRIPTION

Processes and systems are disclosed for generating an associated set of neighbors for each of geographically distributed radio transmitters. These processes can be implemented at a computing device for generating sets of neighbors for each of geographically distributed radio transmitters.

The processes and systems disclosed in this specification can be implemented as part of internet-based services, also known as cloud services, such as, for example, the MOBILE ME® service (available from Apple, of Cupertino, Calif.), for facilitating location-based services (LBS).

Figure 1:
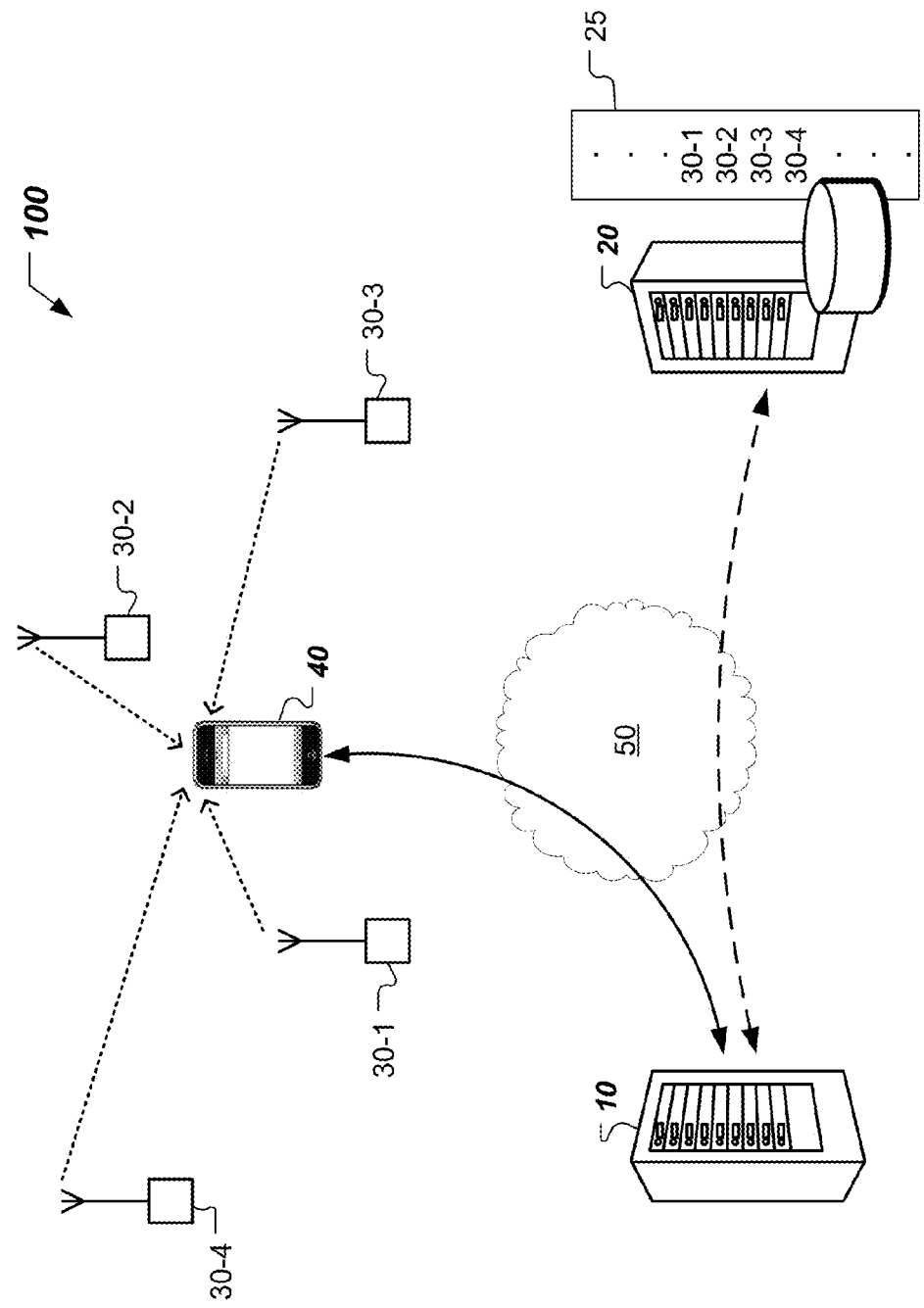
FIG. 1 shows an example system including a computing device for providing location-based services to mobile devices in communication with the computing device.

FIG. 1 shows a block diagram of an example system 100 including a computing device 10, for providing LBS to a mobile device 40 in communication with the computing device 10. The mobile device 40 can communicate with other mobile devices or with the computing device 10 through a radio communication channel via radio transmitters 30-1, . . . , 30-4, . . . of a radio-based communication network. Further, the mobile device 40 can communicate with the computing device 10 via a communication network 50, such as the Internet. Further, the computing device 10 can communicate with a data server 20 that stores, among other things, geo-spatial information 25 relating to the radio transmitters 30-1, . . . , 30-4, . . . of the radio-based communication network. In this specification, geo-spatial or geographical information (data) includes at least a latitude and a longitude corresponding to a location of a radio transmitter. The communication between the computing device 10 and the storage server 20 can be carried out via the Internet 50.

In some implementations, the radio-based communication network can be a cell phone network. In such implementations, mobile device 40 may be, for example, a smartphone or a cell phone, and the radio transmitters 30-1, . . . , 30-4, . . . may be cell towers. The cell towers 30-1, . . . , 30-4, . . . may all belong to a cell network operated by a single carrier, or may be part of multiple cell networks operated by several carriers. The data server 20 may be operated by a centralized entity (e.g., an organization, a body, an enterprise) and may store a unique record for each of cell towers 30-1, . . . , 30-4, . . . being operated around the world. The unique record corresponding to each cell tower may include a set of codes: mobile country code (MCC), mobile network code (MNC), location area code (LAC), and a cell tower ID (CELL). Further, the unique record associated with each cell tower includes a latitude and a longitude associated with the geographical location of each cell tower. The data server 20 stores a record 25 that includes data about 15 million cell towers that are operational world-wide.

In other implementations, the radio-based communication network can be based on WiFi technology. (Wireless Fidelity.) Thus, the radio-transmitters 30-1, . . . , 30-4, . . . may be WiFi transmitters. In yet other implementations, the radio-transmitters 30-1, . . . , 30-4, . . . may be WiMAX transmitters, and the radio-based communication network can be based on WiMAX technology. (Worldwide Interoperability for Microwave Access.) In WiFi or WiMAX implementations, the data server 20 may store a data-set of geographical coordinates for a much larger number of radio transmitters: Hundreds of millions WiFi and WiMAX transmitters, compared with 15 million cell towers corresponding to the cell phone network. Further, in some other implementations, the records of two or more types of networks from among the cell phone network, WiFi network and WiMAX network may be combined in one record, resulting in a very large data-set of geographical coordinates associated with radio-transmitters operating around the world.

In any of the foregoing implementations, the data server 20 can update the data-set 25, including geo-spatial coordinates for each radio transmitter operating around the world, to reflect additions or removals of radio transmitters anywhere in the world. The data server 20 may update the data-set 25 at regular time intervals (for example, daily, weekly, monthly) or as frequently as necessary (for example, in real time, upon reporting of an addition/removal of a radio transmitter). Further, the data server 20 may provide the updated record 25 to the computing device 10 either at regular time intervals (for example, daily, weekly, monthly) or, in real time, upon completion of an update. The updated record 25 can be pushed by the data server 20 to the computing device 10. Alternatively, the updated record 25 can be pulled (requested) by the computing device 10 from the data server 20.

The computing device 10 can receive the updated record 25 including geo-spatial coordinates for each radio transmitter in operation around the world. The computing device 10 can generate a set of nearest neighbors associated with each radio transmitter in the updated record 25 as disclosed in this specification. A set of neighbors can be defined to have up to a predetermined number of neighboring radio transmitters. For example, a first and a second radio transmitters can be considered neighbors if a geographical-distance between the first and the second radio transmitters is smaller than a predetermined distance. The geographical-distance, D(1,2), between the first and the second radio transmitters can be calculated in terms of the geo-spatial coordinates, (lat1, long1) and (lat2, long2), of the first and the second radio transmitters, respectively, in accordance with EQs. 1-3:

$$D(1, 2) = \sqrt{D_{lat}^2(1, 2) + D_{long}^2(1, 2)} \qquad \text{EQ. 1}$$

$$D_{lat}(1, 2) = R_{Earth}\sin\left[(lat_1 - lat_2)\frac{\pi}{180}\right] \qquad \text{EQ. 2}$$

$$D_{long}(1, 2) = R_{Earth}\sin\left[(long_1 - long_2)\frac{\pi}{180}\right]\sin\left(lat_1\frac{\pi}{180}\right) \qquad \text{EQ. 3}$$

The parameter "R_Earth" in EQs. 2, 3 represents the Earth radius (R_Earth=6,372,797.9 m). EQ. 2 provides a formula for calculating a latitude-distance between the first and second radio transmitters. The distance between two lines of latitude separated by 1° is constant and approximately equals 110 km. EQ. 3 provides a formula for calculating a longitude-distance between the first and second radio transmitters. The distance, dlong, between two lines of longitude separated by 1° depends on latitude. For example, dlong=110 km (approximately) at the Equator, and dlong=0 at the poles. At 47° latitude, dlong=80 km (approximately).

Once the sets of nearest neighbors associated with each radio transmitter have been generated, the computing device 10 can load the generated sets of neighbors in memory. Thus, when a mobile device 40 in communication with computing device 10 requests a set of neighbors of a given radio transmitter, the computing device 10 can provide, for example, the requested set of neighbors and the geo-spatial coordinates associated with the requested set of neighbors.

Such a request can be placed when a mobile device 40 attempts to determine its geographic location (specifically, latitude and longitude at current location of the mobile device). For example, a user may turn on a smartphone 40 to look up diners in its geographical vicinity. The smartphone 40 may detect signals from four nearby cell towers 30-1, 30-2, 30-3 and 30-4. The detected signals enable the smartphone 40 to identify the four cell towers 30-1, 30-2, 30-3 and 30-4 and to rank the strength of the detected signals. The ranking of the detected signal strengths enable the smartphone 40 to estimate a relative proximity of the smartphone 40 to the identified cell towers. In this example, the smartphone is closest to cell tower 30-1. The smartphone 40 can connect to the cloud service 10 and can request, in some implementations, a list including a set of neighbors of cell tower 30-1 and the geo-spatial coordinates of each of the set of neighbors. In other implementations, the smartphone 40 may also request the geo-spatial coordinates of the other detected cell towers, 30-2, 30-3 and 30-4 (and even their respective set of neighbors).

Once the above information is provided to the smartphone 40 by the cloud service 10, the smartphone 40 may uniquely determine its current geographic location based on triangulating the detected signals from, and using the received geographical coordinates (latitude and longitude) of, cell tower 30-1 and two of its closest neighbors, e.g., 30-2 and 30-3. Upon determining its instant geographical location, the user of the smartphone 40 may accurately lookup diners that are closest to the smartphone's current location.

Additionally, the user of the smartphone 40 can travel over the predetermined distance (covered by the received set of neighbors) and continue to update the smartphone's instant location via the triangulation technique described above, based on the instant three closest cell towers, for as long as the instant three closest cell towers are included in the received set of neighbors. When that is no longer the case, the smartphone 40 can reconnect to the cloud service 10 and may request a set of neighbors of an instant closest cell tower. As requests for data transfer can be expensive in terms of power consumption, it can be a great benefit for the smartphone 40 to continue determining its geographical location, while traveling over the predetermined distance, without having to request further updates from the cloud service 10.

Figure 2A:
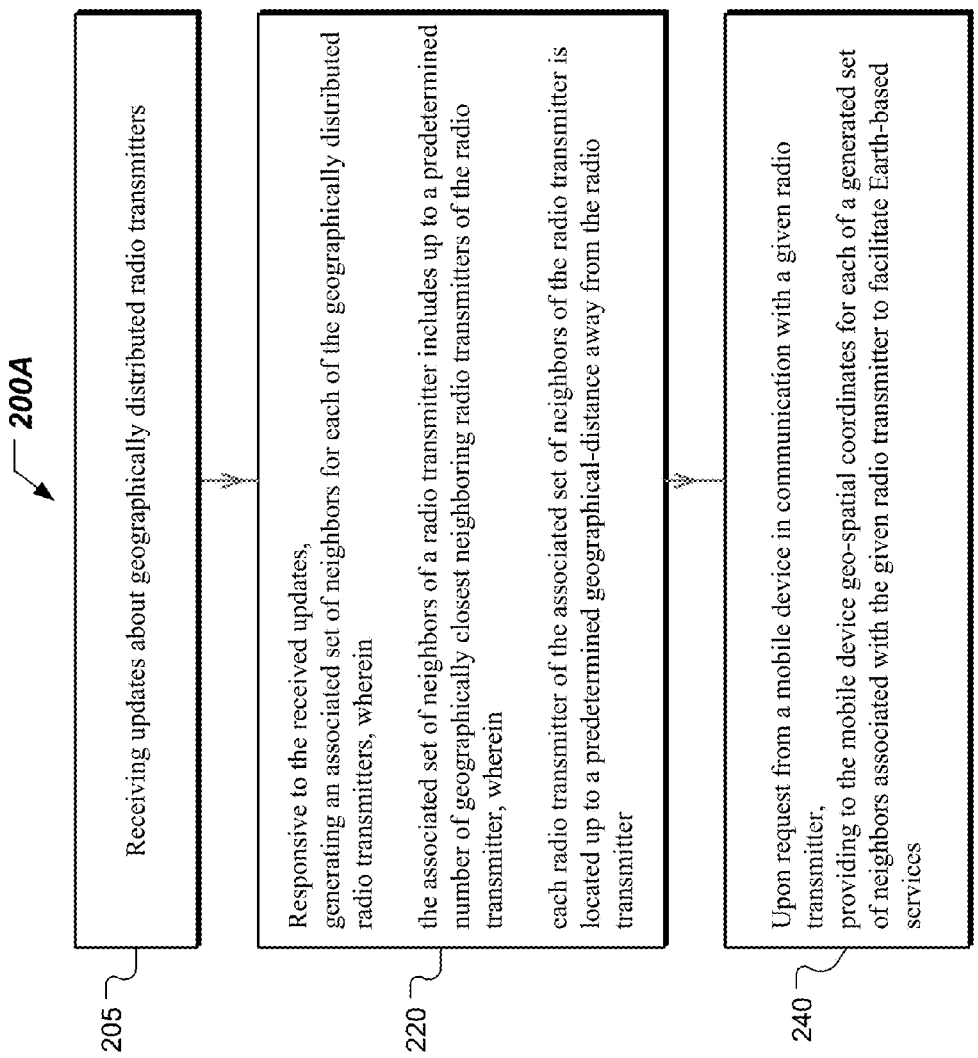
FIG. 2A shows a flow chart of an example process for generating and distributing neighbor information for geo-spatially distributed radio transmitters.

An example of a process 200A for generating and distributing neighbor information for geo-spatially distributed radio transmitters is shown in FIG. 2. Process 200A can be implemented at a cloud service, for example, similar to cloud service 10 discussed in reference to FIG. 1. Further, process 200A can be performed by a computing device, for example, similar to computing device 10 discussed in reference to FIG. 1.

In some implementations, process 200A can start by receiving 205, by a computing device from a storage server, updates about geographically distributed radio transmitters. The received updates can represent a full record of all radio transmitters that operate around the world. The full record may include most recently added radio transmitters. The full record may further reflect absence of most recently removed radio transmitters. Alternatively, the received updated record may only include an indication of the most recently added and removed radio transmitters, i.e., the received record can be a delta-record.

After receiving the updates, process 200A can continue by generating 220 an associated set of neighbors for each of the geographically distributed radio transmitters. The associated set of neighbors of a radio transmitter can include up to a predetermined number of geographically closest neighboring radio transmitters of the radio transmitter. For example, the predetermined number of neighbors can be 20. Further, each radio transmitter of the associated set of neighbors of the radio transmitter is located up to a predetermined geographical-distance away from the radio transmitter. For example, the predetermined geographical-distance may be 50 km. In another example, the predetermined geographical-distance may be 35 km. Furthermore, the generated sets of neighbors corresponding to the geographically distributed radio transmitters can be stored in memory of the computing device of the cloud service.

Upon request from a mobile device in communication with a given radio transmitter, the process 200A can continue by providing 240, by the computing device to the mobile device, geo-spatial coordinates for each of a generated set of neighbors associated with the given radio transmitter. The foregoing information may be provided to facilitate location-based services (LBS). An example of such LBS carried out by cloud service 10 for the benefit of smartphone 40 was discussed above in reference to FIG. 1.

Figure 2B:
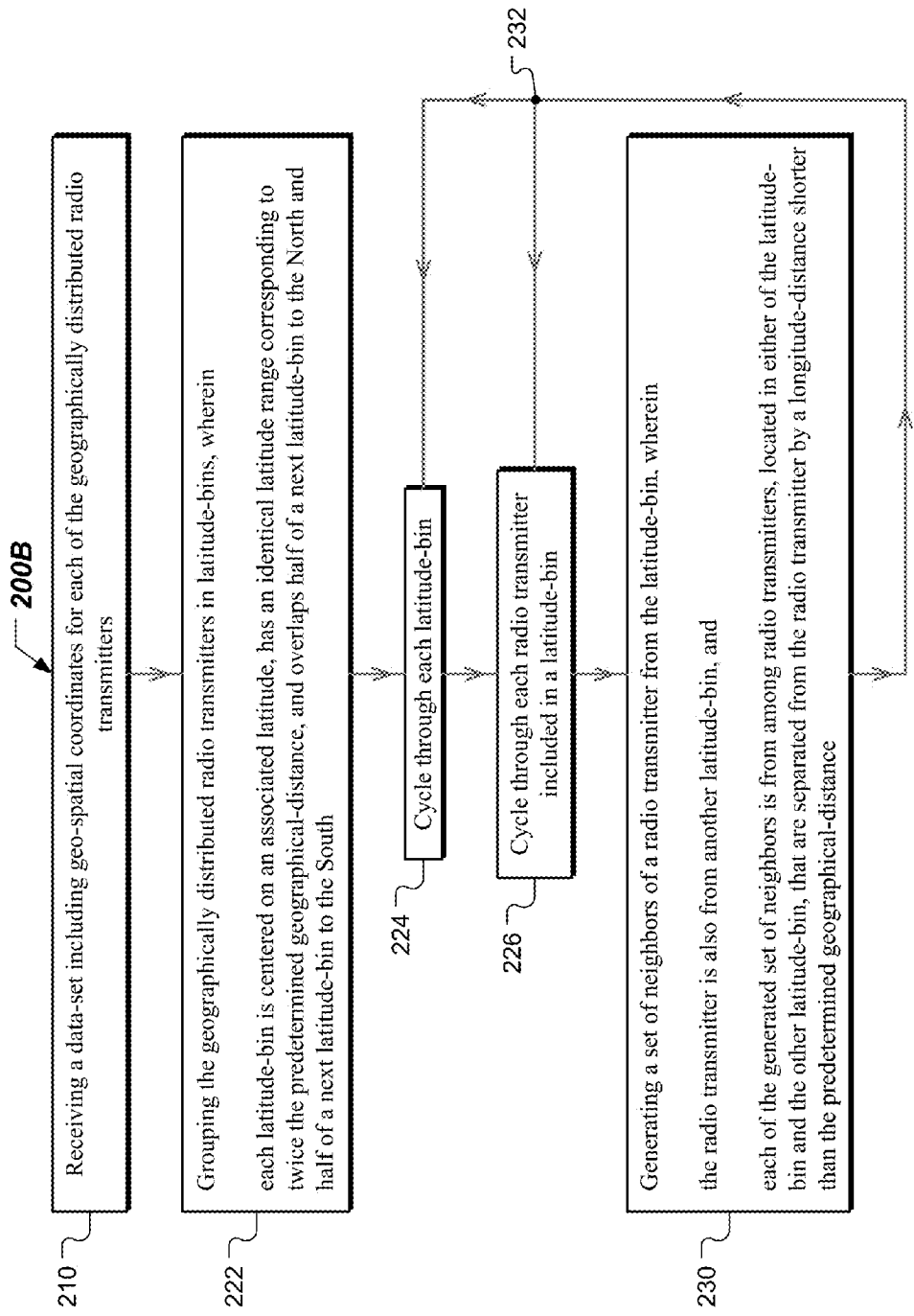
FIG. 2B shows a flow chart of an example process for generating a set of neighbors for each of the geo-spatially distributed radio transmitters.

FIG. 2B shows a flow chart of an example process 200B for generating a set of neighbors for each of the geo-spatially distributed radio transmitters. The process 200B can be implemented, for example, to accomplish the generating 220 of an associated set of neighbors for each of the geographically distributed radio transmitters, as part of process 200A described above in reference to FIG. 2A.

In some implementations, process 200B can start by receiving 210 a data-set including geo-spatial coordinates for each of the geographically distributed radio transmitters. The received data-set can be the updated record described above in reference to FIG. 2A.

Process 200B can continue by grouping 222 the geographically distributed radio transmitters in latitude-bins. Each latitude-bin can be constructed to be centered on an associated latitude. For example, the latitude-bin 47° represents a ribbon (strip) that circles the Earth and is centered on parallel (latitude line) 47°. Each latitude-bin has an identical latitude-range corresponding to twice the predetermined geographical-distance. For example, if the predetermined distance is chosen to be 50 km, then the corresponding latitude-range is 1°, corresponding to 100 km (or twice the predetermined distance of 50 km). Thus, for the above example, the latitude-bin 47° represents a ribbon (strip) that circles the Earth while being centered on parallel (latitude line) 47° and having a width of 100 km. Further, a next latitude-bin is shifted North-bound from the current latitude-bin by half the latitude-range, corresponding to a distance-shift equal to the predetermined geographical-distance. Similarly, another next latitude-bin is shifted South-bound from the current latitude-bin by half the latitude-range, corresponding to a distance-shift equal to the predetermined geographical-distance. For latitude-bin 47° that is centered on parallel (latitude line) 47° and that has a latitude-range (latitude-angle) of 1° (corresponding to twice the predetermined distance of 50 km), the next latitude-bin to the North is centered on parallel (latitude line) 47.5°. And, the next latitude-bin to the South is centered on parallel (latitude line) 46.5°. By incrementing the latitude-bins in the manner described above, each latitude-bin overlaps half of a next latitude-bin to the North and half of a next latitude-bin to the South.

Process 200B can include two process loops. An outer loop cycles 224 through each latitude-bin. An inner loop cycles 226 through each radio transmitter included in a latitude-bin.

Process 200B can continue by generating 230 a set of neighbors of a radio transmitter from the latitude-bin. Based on the description above of latitude-bins, the radio transmitter included in a latitude-bin is also included in another latitude-bin. For example, if the radio transmitter is located in the Northern-half of latitude-bin 47°, then the radio transmitter is also located in (the Southern-half of) latitude-bin 47.5°. However, if the radio transmitter is located in the Southern-half of latitude-bin 47°, then the radio transmitter is also located in (the Northern-half of) latitude-bin 46.5°.

Further, to speed up generating 230 the set of neighbors of the radio transmitter, only the ones from among radio transmitters, located in either of the latitude-bin and the other latitude-bin, that are separated from the radio transmitter by a longitude-distance shorter than the predetermined geographical-distance may be examined to determine whether to be included in the generated set of neighbors. The longitude-distance between a first and second radio transmitters is equal to a distance measured along a line of latitude of the latitude-bin between a meridian (longitude line) of the first radio transmitter and a meridian (longitude line) of the second radio transmitter, in accordance with EQ. 3. For example, if the first and second radio transmitters are included in latitude-bin 47°, a longitude-distance, D(1,2), corresponding to a predetermined geographical-distance of 50 km corresponds to a longitude-range of 0.7°. Therefore, if the first radio transmitter has a longitude of 5.9°, and the second radio transmitter has a longitude of 6.4°, the second transmitter may be considered for inclusion in the generated set of neighbors of the first radio transmitter, as the longitude-distance between the second and first radio transmitters is shorter then the predetermined geographical-distance of 50 km. However, if the longitude of the first radio transmitter is 5.9°, and the longitude of the second radio transmitter is 6.9°, the second transmitter may not be considered for inclusion in the set generated set of neighbors of the first radio transmitter, as the longitude-distance between the second and first radio transmitters is longer then the predetermined geographical-distance of 50 km.

Examining the ones from among radio transmitters, located in either of the latitude-bin and the other latitude-bin, that are separated from the radio transmitter by a longitude-distance shorter than the predetermined geographical-distance can involve calculating a geographic-distance from the examined radio-transmitter to the radio transmitter. The examined ones having a calculated geographic-distance shorter than the predetermined geographic-distance can be included in the set of neighbors of the radio transmitter.

Process 200B may include, as part of generating 230 the set of neighbors of the radio transmitter, an intermediate step of sorting the radio transmitters from the latitude-bin by longitude-distance to the radio transmitter. Sorting by longitude-distance can be performed in two steps. A step involves sorting the radio transmitters in the latitude-bin by longitude. Another step involves subtracting the longitude of the radio transmitter from the longitude of each radio transmitter in the latitude-bin. The sorting and the subtracting can be performed in either order. Then, as disclosed above, generating 230 the set of neighbors of the radio transmitter may proceed by examining the ones from among the radio transmitters included in the sorted latitude bin that are separated from the radio transmitter by a longitude-distance shorter than the predetermined geographical-distance.

Process 200B may include, as part of generating 230 the set of neighbors of the radio transmitter, another intermediate step of sorting the radio transmitters from the other latitude-bin that includes the radio transmitter. The sorting of the other latitude-bin is performed (similarly as the sorting of the latitude-bin) by longitude-distance to the radio transmitter. Then, as disclosed above, updating the generated set of neighbors of the radio transmitter may proceed by examining the ones from among the radio transmitters included in the sorted other latitude bin that are separated from the radio transmitter by a longitude-distance shorter than the predetermined geographical-distance.

FIGS. 3A-3F are block diagrams showing aspects of an example implementation of a process for generating a set of neighbors of a radio transmitter. The process implemented in FIGS. 3A-3F may be based on a combination of processes 200A and 200B described above, in reference to FIGS. 2A and 2B.

Figure 3A:
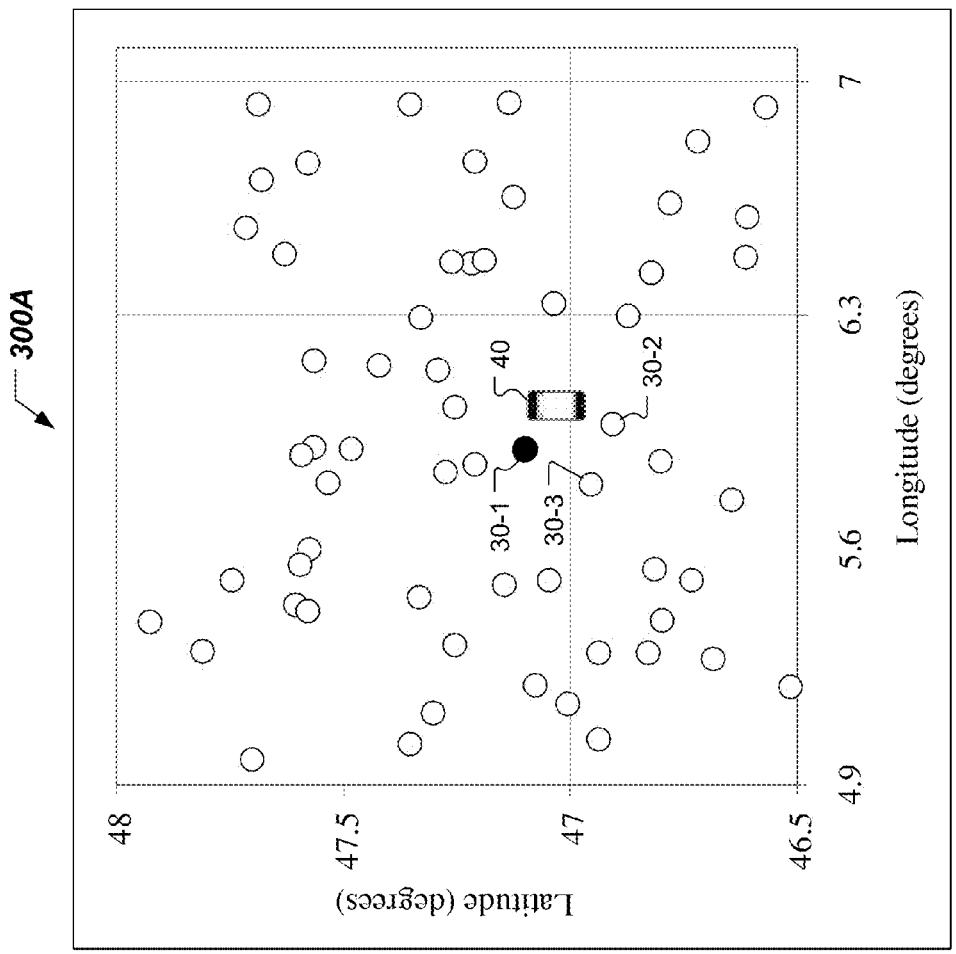
FIGS. 3A-3F are block diagrams showing aspects of an example implementation of a process for generating a set of neighbors for a radio transmitter.

FIG. 3A shows an image 300A of a map of Neuchatel, Switzerland. Parallels (latitude lines) of 46.5°, 47°, 47.5° and 48° (N) are represented on the map. Meridians (longitude lines) of 4.9°, 5.6°, 6.3° and 7° (E) are also represented on the map. Parallels that are 0.5° apart are separated by a geographical-distance of 50 km. For example, a geographical-distance of 50 km can be measured along meridian 4.9° from parallel 47° to parallel 47.5°. Further, at Neuchatel's latitude, meridians that are 0.7° apart are separated by a geographical-distance of 50 km. For example, a geographical-distance of 50 km can be measured along parallel 47° from meridian 4.9° to meridian 5.6°.

Detailed features of the map have been excluded except for representations (circles) of sixty radio transmitters in and around the vicinity of Neuchatel. A tourist may turn on her smartphone 40 and may detect signals from radio transmitters 30-1 (filled circle), 30-2 and 30-3. The signal detected from radio transmitter 30-1 is the strongest, thus indicating that radio transmitter 30-1 is the closest radio transmitter to smartphone 40. A request to a cloud service placed by smartphone 40, as described for example in FIG. 1, can result in the smartphone 40 receiving geo-spatial coordinates for each of a set of neighbors associated with the radio transmitter 30-1.

FIGS. 3B-3F illustrate aspects of an example process, performed by a computing device of the cloud service, for generating the set of neighbors associated with the radio transmitter 30-1. The generated set of neighbors of radio transmitter 30-1 can contain up to, for example, twenty radio transmitters. Each radio transmitter included in the generated set of neighbors is separated from radio transmitter 30-1 by a geographical-distance shorter than 50 km.

Figure 3B:
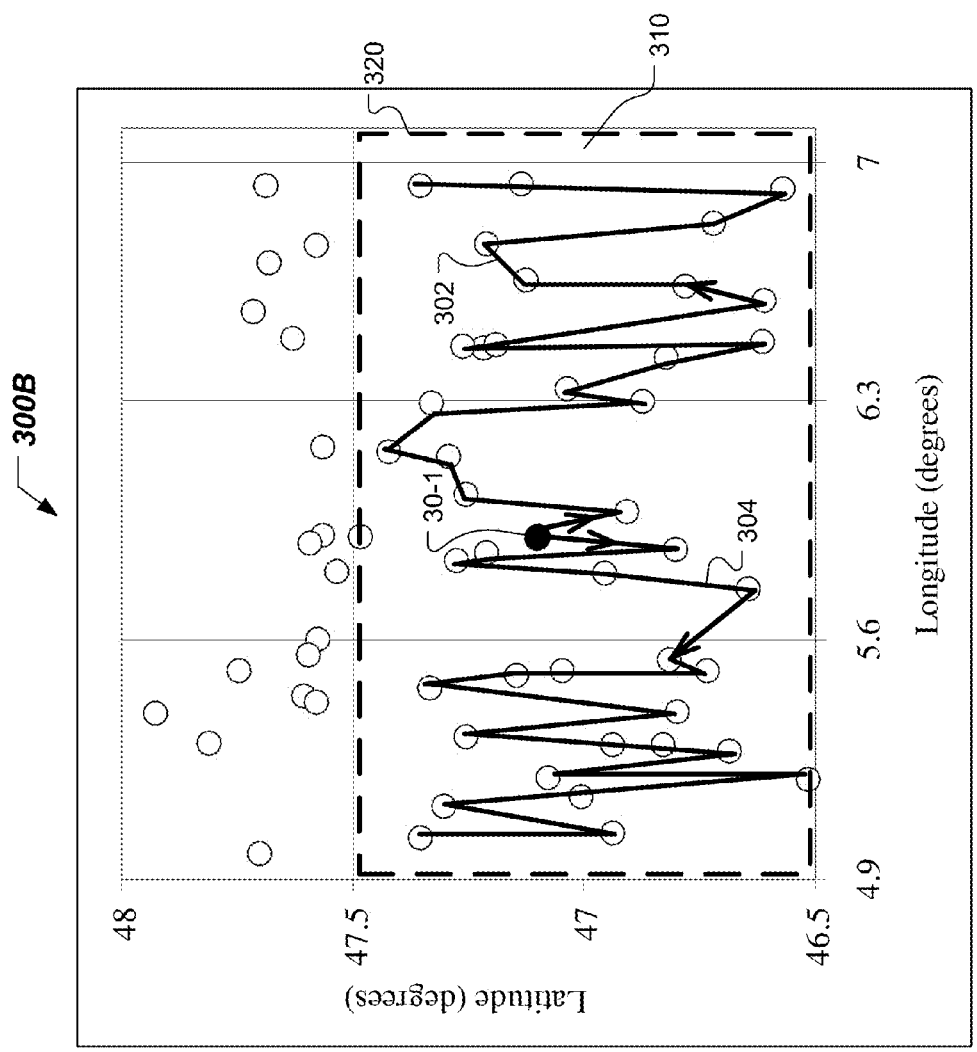

FIG. 3B shows an image 300B of the map of Neuchatel. A portion 320 of a latitude-bin 310 centered on parallel 47° is overlaid on the map image 300B. The radio transmitter 30-1 is included in latitude-bin 310. The portion 320 of the latitude-bin 310 shown on the image 300B (in dashed line) is limited to the West by meridian 4.9° and to the East by meridian 7°. However, the latitude-bin 310 extends, beyond the Western and Eastern boundaries of the portion 320, around the Earth, to close on itself in ribbon (strip)-fashion, as described above. The radio transmitters included in latitude-bin 310 can be sorted in order of increasing longitude-distance from radio transmitter 30-1. In this implementation, the sorting is performed by tying the radio transmitters together, in a manner similar to adding pearls on a string, to construct an East-bound string 302, and a West-bound string 304. The strings 302 and 304 may extend beyond the Eastern and Western boundaries, respectively, of portion 320 of latitude-bin 310.

Figure 3C:
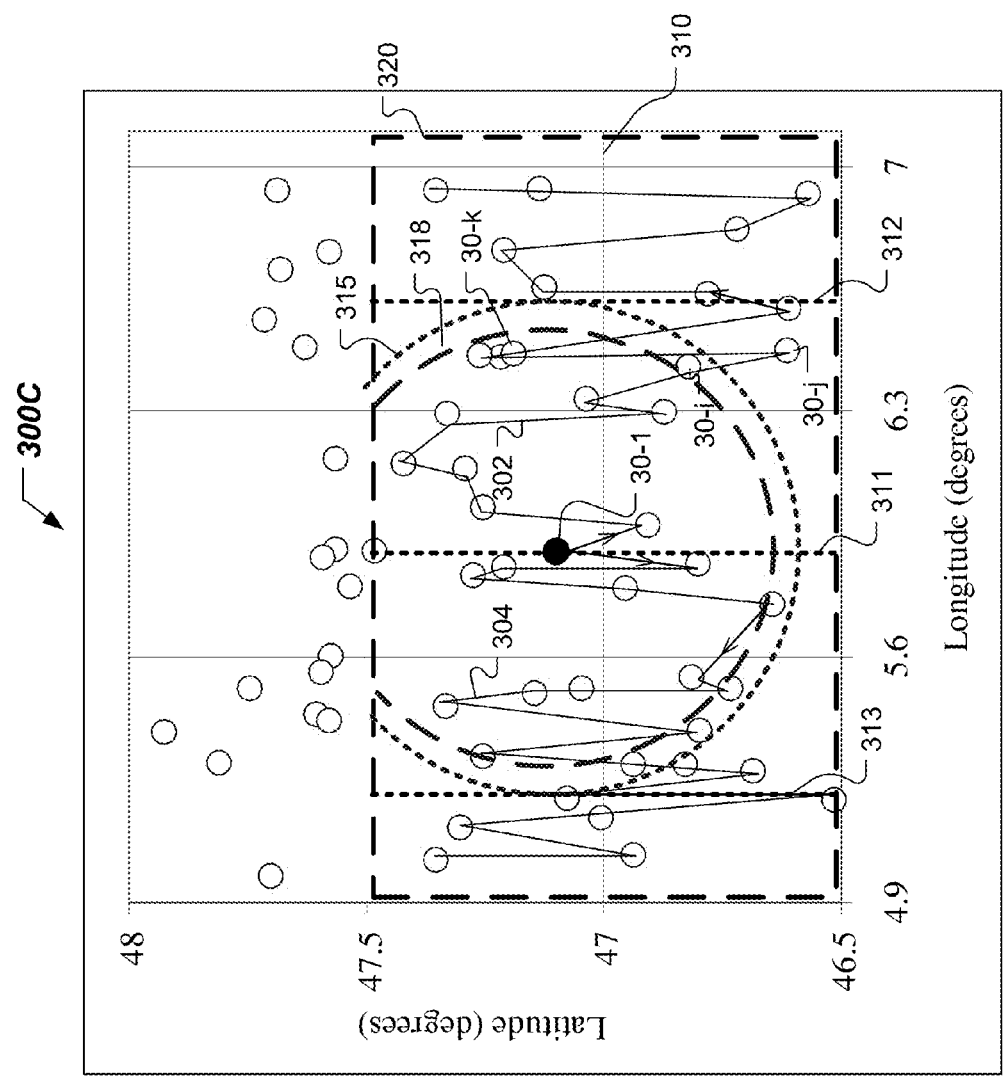

FIG. 3C shows an image 300C of the map of Neuchatel, including the portion 320 of latitude-bin 310 containing radio transmitters from latitude-bin 310 ordered along East-bound string 302, and West-bound string 304, in order of increasing longitude-distance from radio transmitter 30-1. Also overlaid on the map image 300C are longitude line 311 of the radio transmitter, and longitude lines 312 and 313 (represented by dotted lines). The longitude lines 312 and 313 are separated from longitude line 311 by a longitude-range corresponding to the predetermined geographical-distance. In the example implementation shown in FIG. 3C, longitude lines 312 and 313 are separated from longitude line 311 by a longitude-range of 0.7°, corresponding to the predetermined geographical-distance of 50 km. Additionally, the dotted-lined circle 315 overlaid on the map image 300C encompasses an area centered on the radio transmitter 30-1 and having a radius equal to the predetermined geographical-distance (of 50 km, in this example).

Each radio transmitter on string 302 located to the West of longitude line 312 can be examined to determine whether to be included in the generated set of neighbors. Also, each radio transmitter on string 304 located to the East of longitude line 313 can be examined to determine whether to be included in the generated set of neighbors.

Consider, for example, radio transmitter 30-$i$ on string 302. Radio transmitter 30-$i$ on string 302 is located to the West of longitude line 312. Once the computing device can establish that radio transmitter 30-$i$ is to be examined based on the foregoing criterion, the computing device can calculate the geographical-distance, $D(1,i)$, between radio transmitter 30-1 and radio transmitter 30-$i$ in accordance to EQs. 1-3. As shown in FIG. 3C, radio transmitter 30-$i$ is located inside circle 315 (the 50 km-circle, in this example), thus, the computing device can determine that radio transmitter 30-$i$ may be added to the set of neighbors of radio transmitter 30-1. If the set of neighbors being generated has fewer than the predetermined number of neighbors (20, for this example), radio transmitter 30-$i$ is added to the set of neighbors. If, however, the set of neighbors being generated has already reached the predetermined number of neighbors (20, for this example), then the computing device compares the calculated geographical-distance, $D(1,i)$, with the maximum geographical-distance for the set of neighbors. If the calculated geographical-distance, $D(1,i)$, is longer than the maximum geographical-distance for the set of neighbors, then the radio transmitter 30-$i$ cannot be added to the set of neighbors. Alternatively, if the calculated geographical-distance, $D(1,i)$, is shorter than the maximum geographical-distance for the set of neighbors, then the radio transmitter corresponding to the maximum geographical-distance is eliminated from the set of neighbors, and the radio transmitter 30-$i$ is be added to the set of neighbors.

Consider next, for example, radio transmitter 30-$j$ located Eastward from radio transmitter 30-$i$ on string 302. Radio transmitter 30-$j$ on string 302 is located to the West of longitude line 312. Once the computing device can establish that radio transmitter 30-$j$ is to be examined based on the foregoing criterion, the computing device can calculate the geographical distance, $D(1,j)$, between radio transmitter 30-1 and radio transmitter 30-$j$ in accordance to EQs. 1-3. As shown in FIG. 3C, radio transmitter 30-$j$ is located outside circle 315, thus, the computing device can determine that radio transmitter 30-$i$ may not be added to the set of neighbors of radio transmitter 30-1. The computing device continues next to examine the radio transmitter 30-$k$ located Eastward from radio transmitter 30-$j$ on string 302, and so on.

Once the set of neighbors being generated reaches the predetermined number (20 in this example), a subsequent radio transmitter on either of strings 302 and 304 may be examined if the subsequent radio transmitter is separated from the radio transmitter 30-1 by a longitude-distance shorter than the maximum geographical-distance for the current set of neighbors. Prior to the set of neighbors being generated having reached the predetermined number (20, in this example), the longitude-distance of a subsequent radio tower is compared with the predetermined geographical-distance (50 km, in this example) to determine whether to examine the subsequent radio tower. The dashed-line circle 318 overlaid on the map image 300C encompasses an area centered on the radio transmitter 30-1 and having a radius equal to the maximum geographical-distance for the set of 20 neighbors of radio transmitter 30-1.

Each and every radio transmitter examined during the processing of latitude-bin 310 can be tagged (marked) accordingly, whether or not the respective radio transmitter has been included in the set of neighbors of radio transmitter 30-1. Such tagging, that marks a radio transmitter as having been examined, can prevent double processing of the radio transmitter during the processing of the other latitude-bin 330 that includes the radio transmitter 30-1.

Figure 3D:
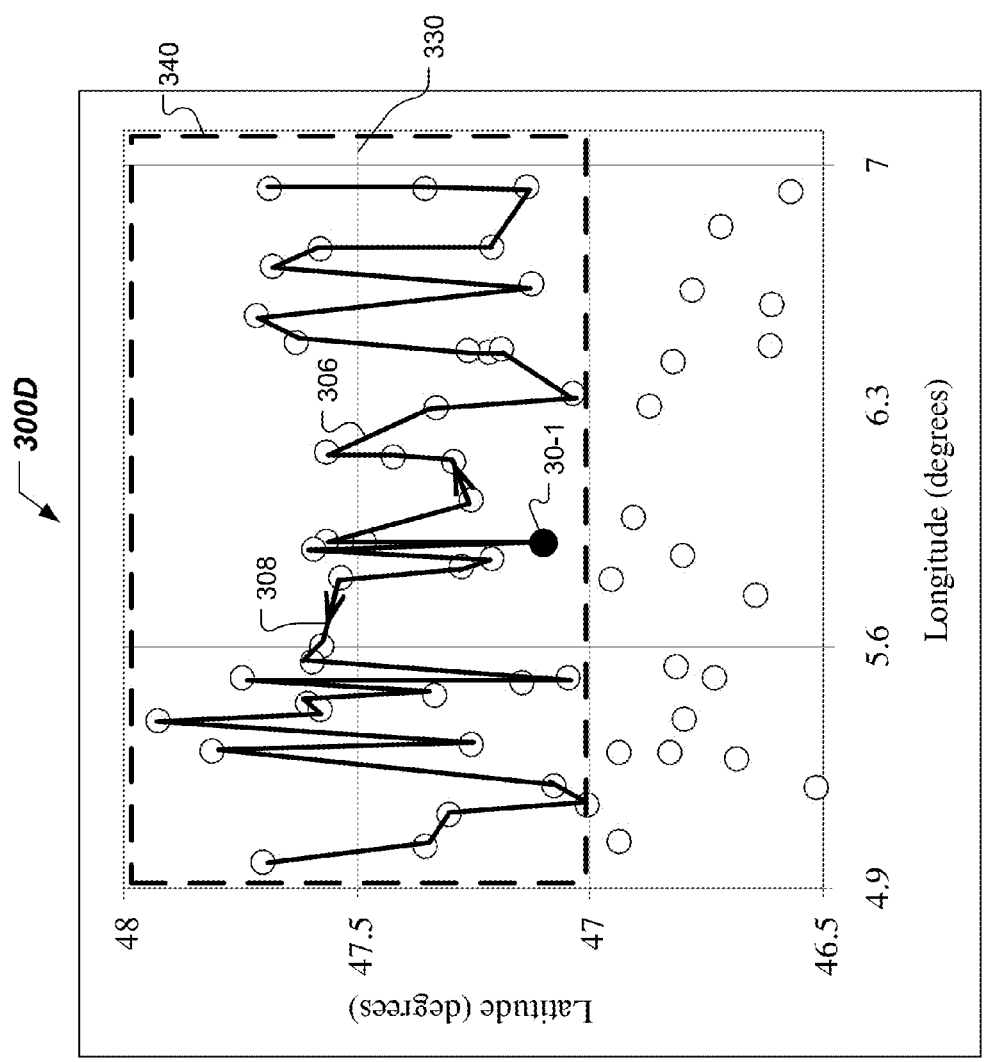

FIG. 3D shows an image 300D of the map of Neuchatel. A portion 340 of a latitude-bin 330 centered on parallel 47.5° is overlaid on the map image 300D. The radio transmitter 30-1 is included in latitude-bin 330. The portion 340 of the latitude-bin 330 shown on the image 300D (in dashed line) is limited to the West by meridian 4.9° and to the East by meridian 7°. However, the latitude-bin 330 extends, beyond the Western and Eastern boundaries of the portion 340, around the Earth, to close on itself in ribbon (strip)-fashion, as described above. The radio transmitters included in latitude-bin 330 can be sorted in order of increasing longitude-distance from radio transmitter 30-1. In this implementation, the sorting is performed by tying the radio transmitters together, in a manner similar to adding pearls on a string, to construct an East-bound string 306, and a West-bound string 308. The strings 306 and 308 may extend beyond the Eastern and Western boundaries, respectively, of portion 340 of latitude-bin 330.

Figure 3E:
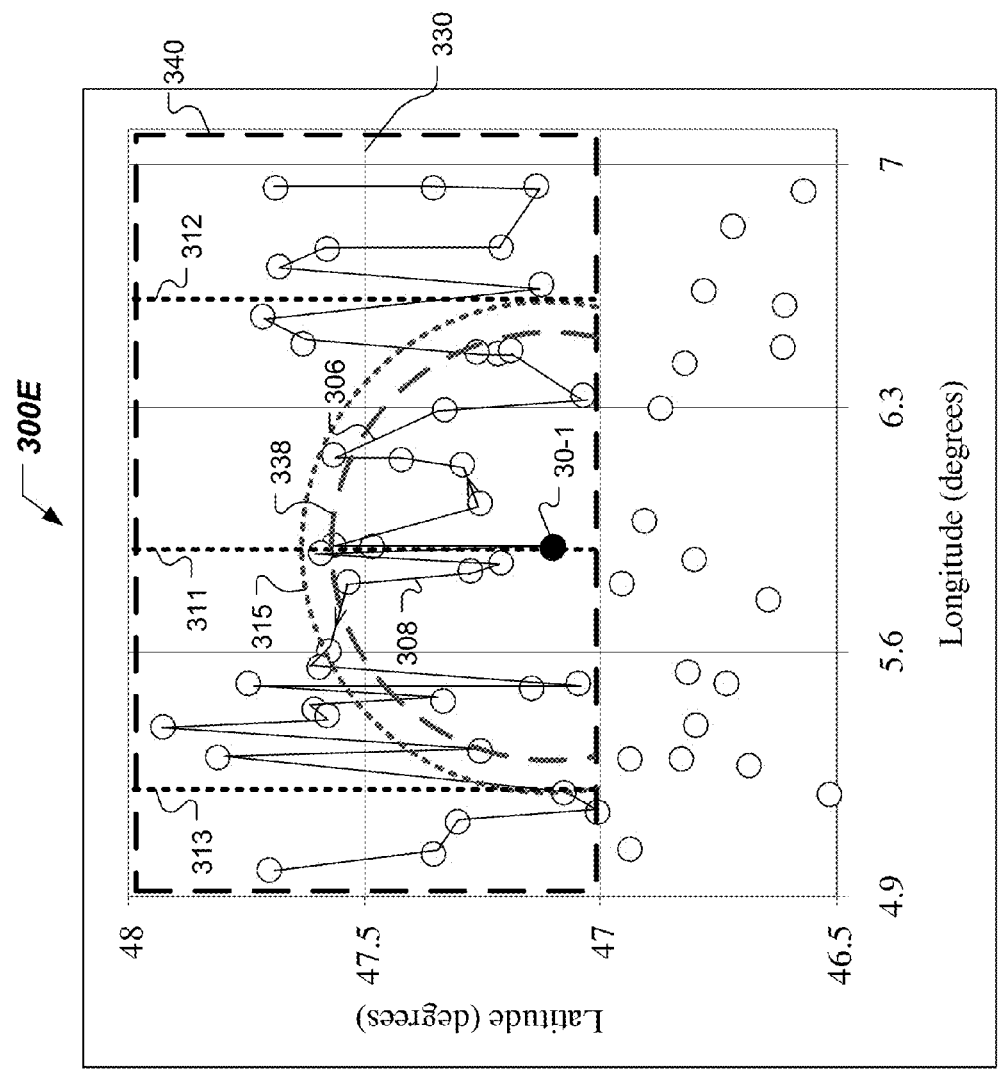

FIG. 3E shows an image 300E of the map of Neuchatel, including the portion 340 of latitude-bin 330 containing radio transmitters from latitude-bin 330 ordered along East-bound string 306, and West-bound string 308, in order of increasing longitude-distance from radio transmitter 30-1. Also overlaid on the map image 300E are longitude line 311 of the radio transmitter, and longitude lines 312 and 313 (represented by dotted lines). The longitude lines 312 and 313 are separated from longitude line 311 by a longitude-range corresponding to the predetermined geographical-distance. In the example implementation shown in FIG. 3E, longitude lines 312 and 313 are separated from longitude line 311 by a longitude-range of 0.7°, corresponding to the predetermined geographical-distance of 50 km. Additionally, the dotted-lined circle 315 overlaid on the map image 300E encompasses an area centered on the radio transmitter 30-1 and having a radius equal to the predetermined geographical-distance (of 50 km, in this example).

However, the radio transmitters located in the Southern-half of latitude-bin 330 have been examined during the processing of latitude-bin 310 and have been tagged accordingly. By avoiding to reprocess (skipping examination of) the tagged radio transmitters in latitude-bin 330, the processing of strings 306 and 308 can be sped up significantly. Therefore, the radio towers to be examined during the processing of the other latitude-bin 330 can be chosen from among untagged radio transmitters of strings 306 and 308.

Prior to the set of neighbors being generated having reached the predetermined number (20, in this example), each untagged radio transmitter on string 306 located to the West of longitude line 312 can be examined to determine whether to be included in the generated set of neighbors. Also, each untagged radio transmitter on string 308 located to the East of longitude line 313 can be examined to determine whether to be included in the generated set of neighbors. Once the set of neighbors being generated reaches the predetermined number (20 in this example), a subsequent untagged radio transmitter on either of strings 306 and 308 may be examined if the subsequent untagged radio transmitter is separated from the radio transmitter 30-1 by a longitude-distance shorter than the maximum geographical-distance for the current set of neighbors.

Consider, for example, a next radio transmitter on of strings 306 and 308. Once the computing device can establish that the next radio transmitter is to be examined based on the foregoing criteria, the computing device can calculate the geographical-distance between the next radio transmitter and radio transmitter 30-1 in accordance to EQs. 1-3. For example, the next radio transmitter can be located inside circle 315 (the 50 km-circle, in this example), thus, the computing device can determine that the next radio transmitter may be added to the set of neighbors of radio transmitter 30-1. If the set of neighbors being generated has fewer than the predetermined number of neighbors (20, for this example), the next radio transmitter is added to the set of neighbors. If, however, the set of neighbors being generated has already reached the predetermined number of neighbors (20, for this example), then the computing device compares the calculated geographical-distance with the maximum geographical-distance for the set of neighbors. If the calculated geographical-distance is longer than the maximum geographical-distance for the set of neighbors, then the next radio transmitter cannot be added to the set of neighbors. Alternatively, if the calculated geographical-distance is shorter than the maximum geographical-distance for the set of neighbors, then the radio transmitter corresponding to the maximum distance is eliminated from the set of neighbors, and the next radio transmitter is added to the set of neighbors.

The computing device may continue to examine another untagged radio transmitter located Eastward from the next radio transmitter on string 306 or located Westward from the next radio transmitter on string 308, and so on. The dashed-line circle 338 overlaid on the map image 300E encompasses an area centered on the radio transmitter 30-1 and having a radius equal to the maximum geographical-distance for the set of 20 neighbors of radio transmitter 30-1. Note that some of the towers included in the generated set of neighbors of radio transmitter 30-1 are located only in latitude-bin 330 (to the North of parallel 47.5°). Some other of the towers included in the generated set of neighbors of radio transmitter 30-1 are located only in latitude-bin 310 (to the South of parallel 47°). And the remaining towers included in the generated set of neighbors of radio transmitter 30-1 are located in the overlapping areas of latitude-bins 310 and 330 (between parallels 47° and 47.5°).

Figure 3F:
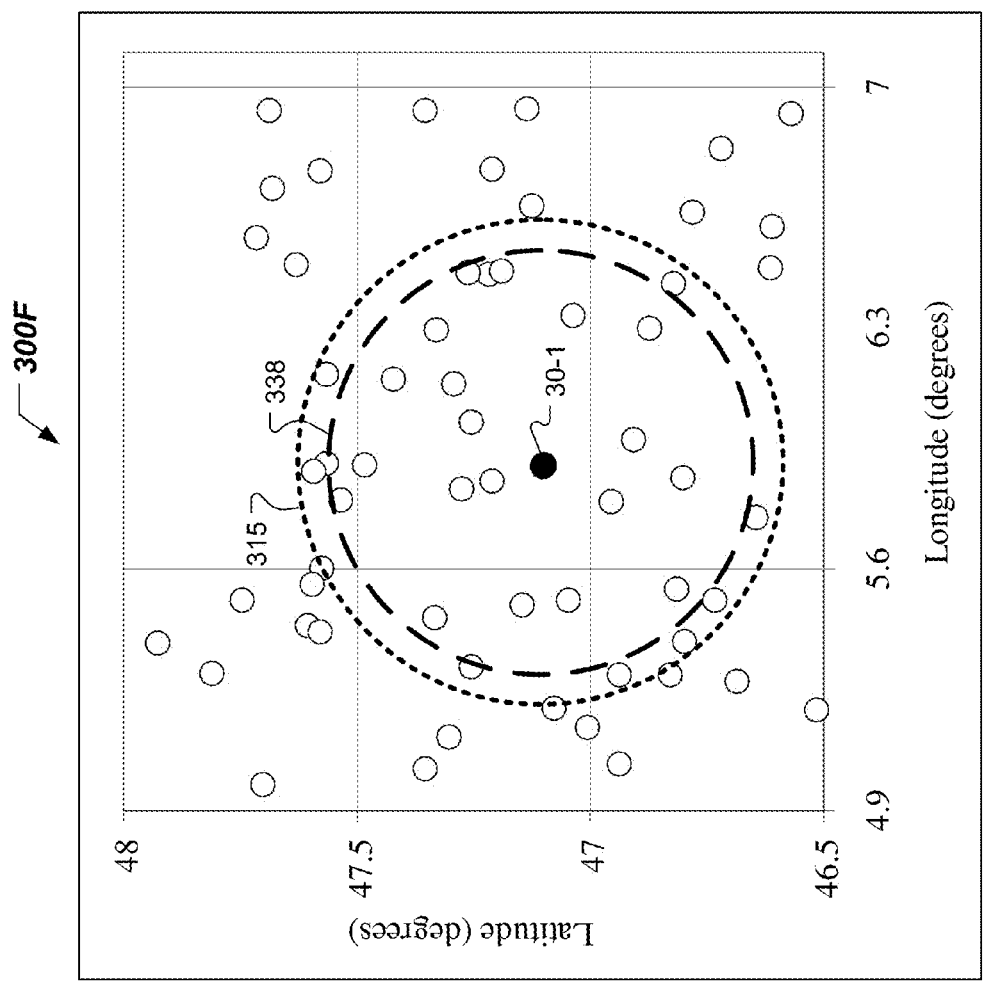

Finally, FIG. 3F shows an image 300F of the map of Neuchatel. The dotted-lined circle 315 overlaid on the map image 300F encompasses an area centered on the radio transmitter 30-1 and having a radius equal to the predetermined geographical-distance (of 50 km, in this example). Additionally, the dashed-line circle 338 overlaid on the map image 300F encompasses an area centered on the radio transmitter 30-1 and having a radius equal to the maximum geographical-distance for the generated set of 20 neighbors of radio transmitter 30-1. In this example, the maximum geographical-distance for the set of 20 neighbors of radio transmitter 30-1 is shorter that the predetermined geographical distance of 50 km. In other geographical vicinities, where the spatial distribution of radio transmitters may be sparser, the generated set of neighbors of a given radio transmitter may not reach the predetermined number (for example, 20) over an area of radius equal to the predetermined geographical distance (for example, 50 km).

Figure 4:
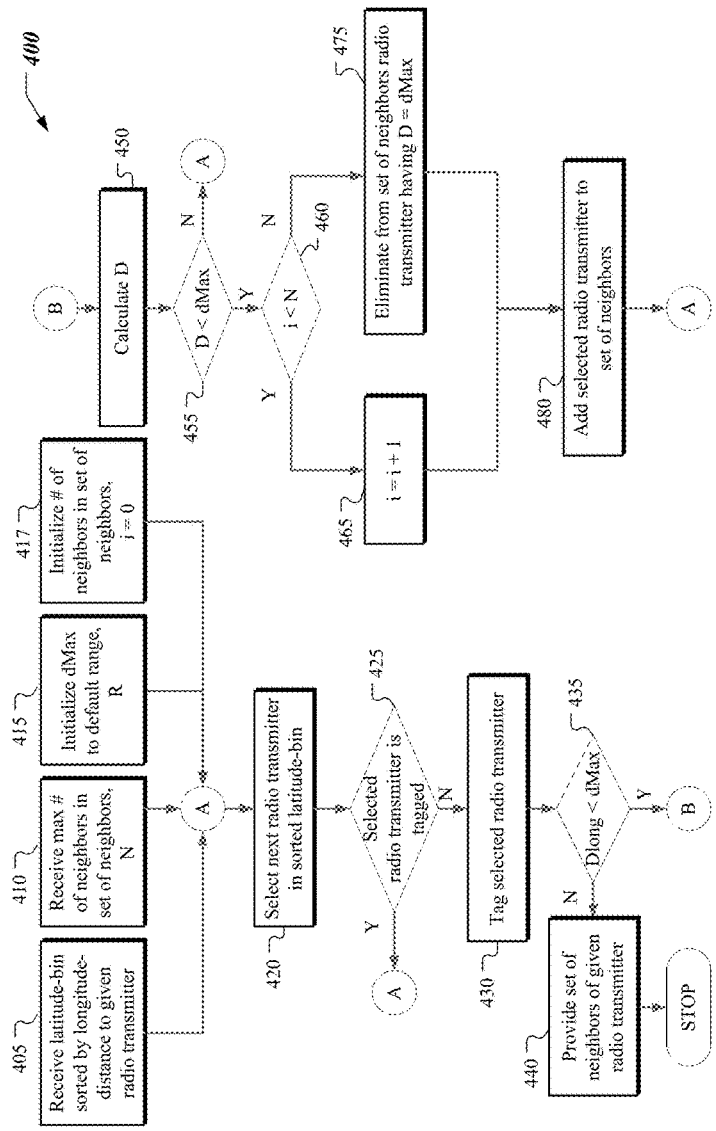
FIG. 4 shows a flow chart of an example process for generating a set of neighbors for a radio transmitter.

FIG. 4 shows a flow chart of an example process 400 for generating a set of neighbors of a given radio transmitter from among radio transmitters grouped in a latitude bin. For example, process 400 can be applied to generate the set of neighbors of radio transmitter 30-1 as described in the example implementation illustrated in FIGS. 3B and 3C, or in FIGS. 3D and 3E.

In some implementations, process 400 receives 405 a dataset including geo-spatial coordinates (latitude and longitude) of radio transmitters located in the same latitude-bin as the given radio transmitter. For example, in FIGS. 5B and 5C, the given radio transmitter may be labeled 30-1, and the latitude-bin may be labeled 310. The radio transmitters in the latitude-bin can be sorted by longitude-distance to the given radio transmitter.

Process 400 can receive 410 an indication of what the maximum number of neighbors in the set of neighbors, N, is desired to be. In reference to FIGS. 3B and 3C, N has been referred to as the predetermined number of the set of neighbors. The maximum number of neighbors can be chosen to be N=20.

Process 400 can initialize 415 a maximum geographical-distance for the set of neighbors, dMax, to a default radius (range), R. The maximum geographical-distance for the set of neighbors, dMax, can remain fixed to the default radius, R, for as long as the set of neighbors has not reached the maximum number of neighbors, N. Else, if the set of neighbors has reached the maximum number of neighbors, N, then the maximum geographical-distance for the set of neighbors, dMax, can be a distance measured from the given radio transmitter to the farthest among the set of N-neighbors.

Process 400 can initialize 417 a count of radio transmitters in the set of neighbors to zero prior to generating the set of neighbors for the given radio transmitter. The count can be incremented by 1 from 0 to N.

Process 400 can select 420 a next radio transmitter in the sorted latitude-bin. The node A associated with the selection 420 represents an indication of an iterative selection. Specifically, the operations of process 400 can be applied to each radio transmitter in the latitude-bin based on the conditional steps described below. Thus, the next radio transmitter can refer to a first (closest) radio transmitter near the given radio transmitter at the beginning of the iterative process 400. However, the next radio transmitter can refer to any other radio transmitter included on the ordered strings 202 and 204 in FIGS. 3B and 3C, or on the ordered strings 206 and 208 in FIGS. 3D and 3E, for example.

Process 400 verifies 425 whether the selected radio transmitter is tagged as having been previously processed. A tagged radio transmitter is skipped (not reprocessed), and a next radio transmitter can be selected 420 from the sorted latitude-bin. Tagged radio transmitters may have been encountered during the processing of latitude-bin 330, in the example implementations illustrated in FIGS. 3D and 3E, regarding radio towers located in both latitude-bin 310 and latitude-bin 330.

If, however, the selected radio transmitter is untagged, process 400 can tag 430 the selected radio transmitter as processed. Tagging radio transmitters may have been applied during the processing of latitude-bin 310, in the example implementations illustrated in FIGS. 3B and 3C, regarding radio towers located in latitude-bin 310.

Process 400 verifies 435 whether the selected radio transmitter is separated from the given tower by a longitude-distance, Dlong, shorter than the maximum geographical-distance for the set of neighbors, dMax. If the selected radio transmitter is separated from the given tower by a longitude-distance, Dlong, longer than the maximum geographical-distance for the set of neighbors, dMax, then process 400 can be completed (stopped) by providing 440 the generated set of neighbors of the given radio transmitter. For example, such a situation may occur in geographical areas having a sparse distribution of radio towers before reaching the maximum number of neighbors, N, in the set of neighbors. However, such condition can also happen, for example, in geographical areas having a dense distribution of radio towers in which the maximum number of neighbors, N, in the set of neighbors can be achieved over a radius smaller than the default range, R.

If, however, the selected radio transmitter is separated from the given tower by a longitude-distance, Dlong, shorter than the maximum geographical-distance for the set of neighbors, process 400 can calculate 450 a geographical-distance, D, from the given radio transmitter to the selected radio transmitter. The geographical-distance, D, can be calculated in accordance with EQs. 1-3.

Process 400 can verify 455 whether the selected radio transmitter is separated from the given tower by a geographical-distance, D, shorter than the maximum geographical-distance for the set of neighbors, dMax. If the selected radio transmitter is separated from the given tower by a geographical-distance, D, longer than the maximum geographical-distance for the set of neighbors, dMax, the process 400 can loop back to select 420 the next radio transmitter in the sorted latitude-bin.

If, however, the selected radio transmitter is separated from the given tower by a geographical-distance, D, shorter than the maximum geographical-distance for the set of neighbors, dMax, process 400 can verify 460 whether the maximum number of neighbors, N, of the set of neighbors has been reached.

If the maximum number of neighbors, N, of the set of neighbors has not been reached, i<N, then process 400 can increment 465 the neighbor counter by one, and can add 480 the selected radio transmitter to the set of neighbors. Finally, process 400 can loop back to select 420 the next radio transmitter in the sorted latitude-bin.

If, however, the maximum number of neighbors, N, of the set of neighbors has been reached, i=N, then process 400 can eliminate 475 from the set of neighbors the radio transmitter separated from the given transmitter by the longest geographical distance, dMax, corresponding to the maximum geographical-distance for the set of neighbors, dMax. Then, process 400 can add 480 the selected radio transmitter to the set of neighbors. And once again, process 400 can loop back to select 420 the next radio transmitter in the sorted latitude-bin.

Figure 5A:
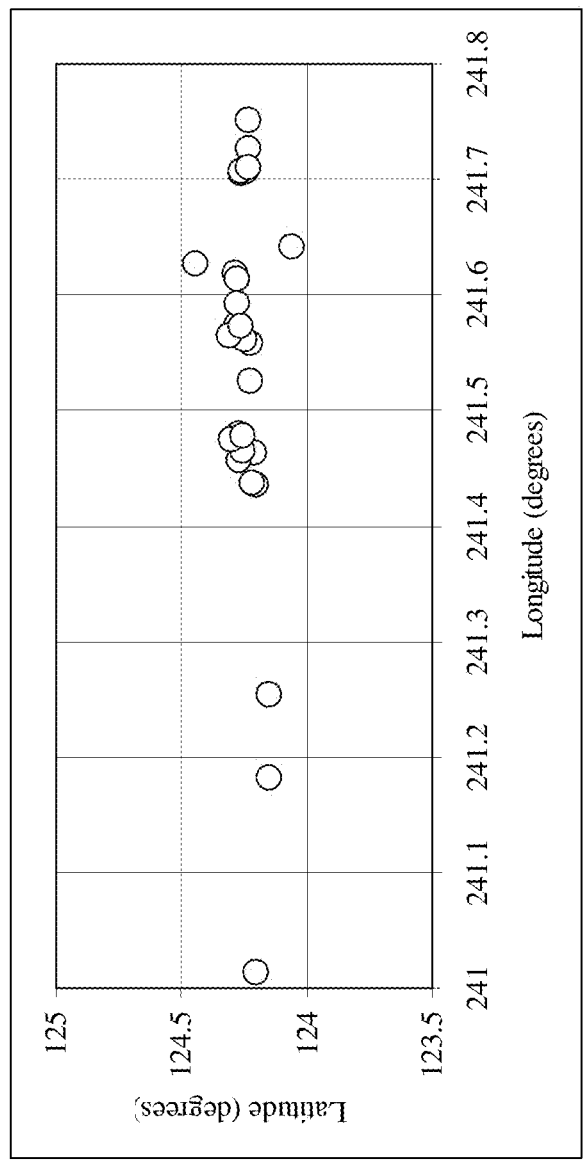

Aspects of processes 200A, 200B and 400 can be combined to generate a set of neighbors associated with each cell tower that is known to be operational on Earth. FIG. 5A shows an image 500A of a map including the location of twenty eight of such cell towers. Latitude on Earth is measured from −90° (South Pole) to 0 (Equator) to +90° (North Pole). Longitude on Earth is measured from 0° (Greenwich Meridian), going Eastward to +180°, and going Westward to −180°. The +180° Meridian is one and the same as the −180° Meridian, and is on the same diameter as the Greenwich Meridian. To simplify computations, in this example, latitude coordinates have been shifted by 90°, such that the corresponding Earth coordinates become 0° for the North Pole, 90° for the Equator, and +180° for the South Pole. To further simplify computations, in this example, longitude coordinates have been shifted by 180°, such that the corresponding Earth coordinates become 180° for the Greenwich Meridian, 0° and/or +360° for the Meridian that is on the same diameter as the Greenwich Meridian. For example, the geo-spatial coordinates for Buenos Aires, Argentina, are lat=−34°, long=−61°. On the map image 500A, the geo-spatial coordinates corresponding to Buenos Aires are lat=124°, long=241°.

FIG. 5B shows a table 500B-1 listing the unique ID (MCC.MNC.LAC.CELL) and the geo-spatial coordinates (Lat, Long) of the 28 cell towers. A table 500B-2 lists a two-dimensional pointer array, each element of the pointer being initialized by −1. The two-dimensional pointer array is also included 4 columns of table 500B-1. For example, the pointer array in columns "next1 up" and "prev1 up" may be used to sort the cell towers in FIG. 5A, similarly to using strings 202 and 204, respectively, to sort the radio transmitters in FIG. 2B. Also for example, the pointer array in columns "next2 down" and "prev2 down" may be used to sort the cell towers in FIG. 5A, similarly to using strings 206 and 208, respectively, to sort the radio transmitters in FIG. 2D.

Figure 5C:
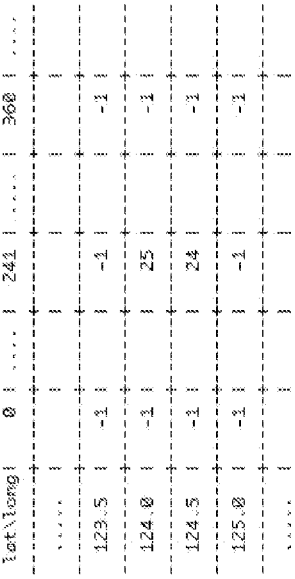

FIG. 5C shows a table 500C-1 including updated columns "next1 up", "prev1 up", "next2 down" and "prev2 down" to indicate the sorting of the 28 cell towers by longitude, for each of latitude-bins 124° and 124.5°. A table 500C-2 lists a updated two-dimensional pointer array, reflecting 25 cell towers included in latitude-bin 124.0°, and 24 cell towers included in latitude bin 124.5°. The latitude-bins 124° and 124.5° have 25 cell towers in common.

FIG. 5D shows a table 500D-1 including updated columns "next1 up", "prev1 up", "next2 down" and "prev2 down" to indicate the sorting of the 28 cell towers by longitude-distance, for each of latitude-bins 124° and 124.5°. Prior to sorting by longitude-distance, the latitude-bins have been subject to closing loops. Closing loops involves tying together the ends of the latitude-bin portions illustrated in the map image 500A. As illustrated in Table D-2, the West-most longitude 241° (depicted in the map image 500A) becomes one and the same with longitude 0°. This operation is equivalent to subtracting 241° from the longitude of each of the other 27 cell towers.

Figure 5E:
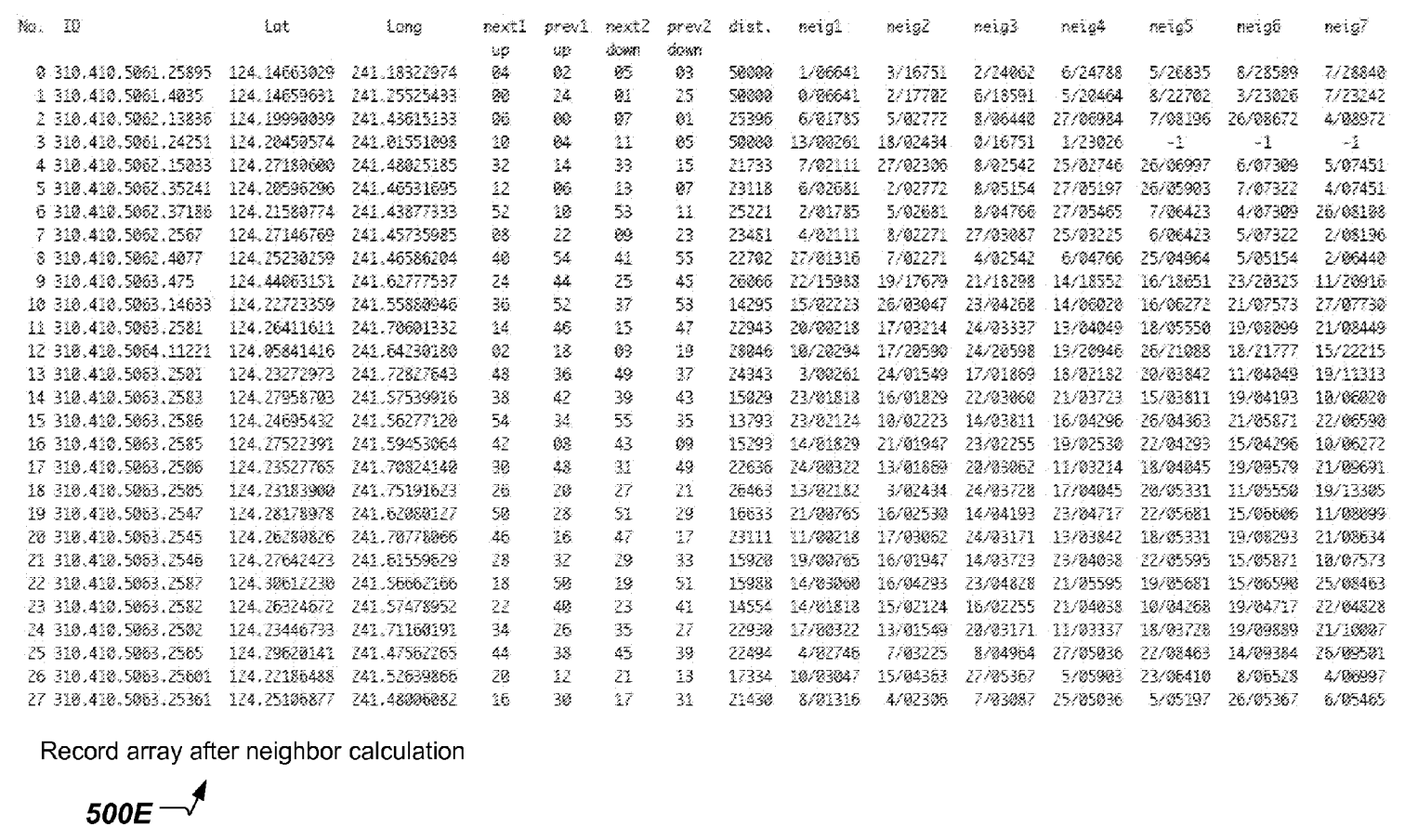

FIG. 5E shows a table 500E including a set of neighbors associated with each of the 28 cell towers. Table 500E extends to the right to include 20 columns corresponding to maximum 20 neighbors in each set of neighbors. However, for clarity, only the first 7 of 20 neighbors are shown in FIG. 5E.

For example, table 500E illustrates that there are 20 neighboring cell towers in the set of neighbors of cell tower 4. The closest neighbor of cell tower 4 is cell tower 7 at a distance of 2.1 km. The second closest neighbor of cell tower 4 is cell tower 27 at a distance of 2.3 km. And so on, to the 20$^{th}$ closest neighbor (or the farthest neighbor), in the set of neighbors of cell tower 4, which is located 21.7 km away (dMax=21.7 km). In another example listed in table 500E, there are 4 neighbors in the set of neighbors of cell tower 3. The closest neighbor of cell tower 3 is cell tower 13 at a distance of 0.3 km. The second closest neighbor of cell tower 3 is cell tower 18 at a distance of 2.4 km. The third closest neighbor of cell tower 3 is cell tower 0 at a distance of 16.8 km. And the second closest (and last) neighbor of cell tower 3 is cell tower 1 at a distance of 23.0 km. Each of the remaining 23 towers is located at a geographical-distance longer than 50 km.

A multitude of computing devices may be used to implement the systems and methods described in this document, as either a client or as a server or plurality of servers. A computing device can be implemented in various forms of digital computers, such as laptops, desktops, workstations, personal digital assistants, servers, blade servers, mainframes, and other appropriate computers. Another computing device can be implemented in various forms of mobile devices, such as personal digital assistants, cellular telephones, smartphones, and other similar computing devices. Additionally, computing devices can include Universal Serial Bus (USB) flash drives. The USB flash drives may store operating systems and other applications. The USB flash drives can include input/output components, such as a wireless transmitter or USB connector that may be inserted into a USB port of another computing device. The components described here, their connections and relationships, and their functions, are meant to be exemplary only, and are not meant to limit implementations of the inventions described and/or claimed in this document.

A computing device can include a processor, memory, a storage device, a high-speed interface connecting to memory and high-speed expansion ports. The computing device can further include a low speed interface connecting to a low speed bus and a storage device. Each of the above components can be interconnected using various busses, and may be mounted on a common motherboard or in other manners as appropriate. The processor can process instructions for execution within the computing device, including instructions stored in the memory or on the storage device to display graphical information for a GUI on an external input/output device, such as a display coupled to high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory can store information within the computing device. In one implementation, the memory can be a volatile memory unit or units. In another implementation, the memory can be a non-volatile memory unit or units. The memory may also be another form of computer-readable medium, such as a magnetic or optical disk.

The storage device can provide mass storage for the computing device. In one implementation, the storage device may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory, the storage device, or memory on processor.

The high speed controller can manage bandwidth-intensive operations for the computing device, while the low speed controller can manage lower bandwidth-intensive operations. Such allocation of functions is exemplary only. In one implementation, the high-speed controller can be coupled to memory, to a display (e.g., through a graphics processor or accelerator), and to high-speed expansion ports, which may accept various expansion cards. In the implementation, low-speed controller can be coupled to the storage device and the low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device may be combined with other components in a mobile device. Each of such devices may contain one or more computing devices or mobile devices, and an entire system may be made up of multiple computing devices and mobile devices communicating with each other.

A mobile device can include a processor, memory, an input/output device such as a display, a communication interface, and a transceiver, among other components. The mobile device may also be provided with a storage device, such as a microdrive or other device, to provide additional storage. Each of the above components is interconnected using various buses, and several of the components may be mounted on a common motherboard or in other manners as appropriate.

The processor can execute instructions within the mobile device, including instructions stored in the memory. The processor of the mobile device may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the mobile device, such as control of user interfaces, applications run by the mobile device, and wireless communication by the mobile device.

The processor of the mobile device may communicate with a user through control interface and display interface coupled to a display. The display may be, for example, a Thin-Film-Transistor Liquid Crystal display or an Organic Light Emitting Diode display, or other appropriate display technology. The display interface may comprise appropriate circuitry for driving the display to present graphical and other information to a user. The control interface may receive commands from a user and convert them for submission to the processor of the mobile device. In addition, an external interface may provide in communication with processor of the mobile device, so as to enable near area communication of the mobile device with other devices. The external interface may provide, for example, for wired communication in some implementations, or for wireless communication in other implementations, and multiple interfaces may also be used.

The memory stores information within the computing mobile device. The memory can be implemented as one or more of a computer-readable medium or media, a volatile memory unit or units, or a non-volatile memory unit or units. An expansion memory may also be provided and connected to the mobile device through an expansion interface, which may include, for example, a SIMM (Single In Line Memory Module) card interface. Such expansion memory may provide extra storage space for the mobile device, or may also store applications or other information for the mobile device. Specifically, expansion memory may include instructions to carry out or supplement the processes described above, and may include secure information also. Thus, for example, expansion memory may be provide as a security module for the mobile device, and may be programmed with instructions that permit secure use of device. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory, expansion memory, or memory on processor that may be received, for example, over transceiver or external interface.

The mobile device may communicate wirelessly through communication interface, which may include digital signal processing circuitry where necessary. Communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as using a Bluetooth, WiFi, or other such transceiver (not shown). In addition, GPS (Global Positioning System) receiver module may provide additional navigation- and location-related wireless data to the mobile device, which may be used as appropriate by applications running on the mobile device.

The mobile device may also communicate audibly using audio codec, which may receive spoken information from a user and convert it to usable digital information. Audio codec may likewise generate audible sound for a user, such as through a speaker, e.g., in a handset of the mobile device. The sound may include sound from voice telephone calls, may include recorded sound (e.g., voice messages, music files, etc.) and may also include sound generated by applications operating on the mobile device.

The mobile computing device may be implemented in a number of different forms. For example, it may be implemented as a cellular telephone. It may also be implemented as part of a smartphone, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

For example, given a set of geographically distributed assets of known latitude and longitude, the processes and systems disclosed in this specification can be used for identifying a set of neighbors of a specified asset. Examples of such geographically distributed assets are water wells, oil rigs, etc. In some implementations, the geographical coordinates of such assets may be recorded as waypoints associated with the assets. Waypoints are sets of coordinates that identify a point in physical space. These coordinates usually include longitude and latitude, and sometimes altitude.

What is claimed is:

1. A method performed by a server computer, the method comprising:
receiving from a central source updates about geographically distributed radio transmitters;
responsive to the received updates, generating an associated set of neighbors for each of the geographically distributed radio transmitters, wherein the associated set of neighbors of a radio transmitter includes up to a predetermined number of geographically-closest neighboring radio transmitters of the radio transmitter, wherein each radio transmitter of the associated set of neighbors of the radio transmitter is located up to a predetermined geographical-distance away from the radio transmitter, wherein said generating the associated set of neighbors for each of the geographically distributed radio transmitters comprises:
receiving a data-set including geo-spatial coordinates for each of the geographically distributed radio transmitters;
grouping the geographically distributed radio transmitters in latitude-bins, wherein each latitude-bin is centered on an associated latitude, has an identical latitude-angle range, and overlaps half of a next latitude-bin to the North and half of a next latitude-bin to the South; and
for each radio transmitter from each latitude-bin, generating a set of neighbors of a radio transmitter from a latitude-bin, wherein the radio transmitter is also from another latitude-bin, and each of the generated set of neighbors is from among radio transmitters, located in either of the latitude-bin and the other latitude-bin, that are separated from the radio transmitter by a longitude-distance shorter than the predetermined geographical-distance, wherein the longitude-distance between a first and second radio transmitters is measured, along a line of latitude of the latitude-bin, between a longitude line of the first radio transmitter and a longitude line of the second radio transmitter; and
upon request from a mobile device in communication with a given radio transmitter, providing to the mobile device geo-spatial coordinates for each of a generated set of neighbors associated with the given radio transmitter to facilitate location-based services (LBS).

2. The method of claim 1, wherein said generating the set of neighbors of the radio transmitter comprises:
sorting radio transmitters from the latitude-bin by longitude-distance to the radio transmitter;
building the set of neighbors of the radio transmitter, wherein radio transmitters included in the built set of neighbors are from the sorted latitude bin;
sorting radio transmitters in the other latitude-bin by longitude-distance to the radio transmitter; and
updating the built set of neighbors, wherein the radio transmitters included in the updated set of neighbors are either from the sorted latitude-bin or from the other sorted latitude-bin.

3. The method of claim 2, wherein said building the set of neighbors of the radio transmitter comprises:
selecting a next radio transmitter from the sorted latitude-bin;
responsive to a longitude-distance between the radio transmitter and the selected radio transmitter being shorter than a maximum distance between the radio transmitter and anyone of the set of neighbors, calculating a geographical distance between the selected radio transmitter and the radio transmitter;
responsive to the calculated distance being shorter than the maximum distance, and to the set of neighbors having fewer that a predetermined number of radio transmitters, adding the selected radio transmitter to the set of neighbors;
responsive to the calculated distance being less than the maximum distance, and to the set of neighbors having the predetermined number of radio transmitters, eliminating from the set of neighbors a radio transmitter corresponding to the maximum distance prior to adding the selected radio transmitter to the set of neighbors; and
responsive to the longitude-distance between the radio transmitter and the selected radio transmitter being longer than the maximum distance, providing the set of neighbors for the radio transmitter.

4. The method of claim 3, further comprising:
tagging the selected radio transmitter; and
skipping the selected radio transmitter upon identification of the tag.

5. A non-transitory computer storage medium encoded with a computer program, the computer program comprising instructions that, when executed by one or more hardware processors, cause the one or more hardware processors to perform operations comprising:
receiving from a central source updates about geographically distributed radio transmitters; and
responsive to the received updates, generating an associated set of neighbors for each of the geographically distributed radio transmitters, wherein the associated set of neighbors of a radio transmitter includes up to a predetermined number of geographically-closest neighboring radio transmitters of the radio transmitter, wherein each radio transmitter of the associated set of neighbors of the radio transmitter is located up to a predetermined geographical-distance away from the radio transmitter, wherein the operation of generating the associated set of neighbors for each of the geographically distributed radio transmitters comprises:
receiving a data-set including geo-spatial coordinates for each of the geographically distributed radio transmitters;
grouping the geographically distributed radio transmitters in latitude-bins, wherein each latitude-bin is centered on an associated latitude, has an identical latitude-angle range, and overlaps half of a next latitude-bin to the North and half of a next latitude-bin to the South; and
for each radio transmitter from each latitude-bin, generating a set of neighbors of a radio transmitter from a latitude-bin, wherein the radio transmitter is also from another latitude-bin, and each of the generated set of neighbors is from among radio transmitters, located in either of the latitude-bin and the other latitude-bin, that are separated from the radio transmitter by a longitude-distance shorter than the predetermined geographical-distance, wherein the longitude-distance between a first and second radio transmitters is measured, along a line of latitude of the latitude-bin, between a longitude line of the first radio transmitter and a longitude line of the second radio transmitter.

6. The non-transitory computer storage medium of claim 5, wherein the operation of generating the set of neighbors of the radio transmitter comprises:
   sorting radio transmitters from the latitude-bin by longitude-distance to the radio transmitter;
   building the set of neighbors of the radio transmitter, wherein radio transmitters included in the built set of neighbors are from the sorted latitude bin;
   sorting radio transmitters in the other latitude-bin by longitude-distance to the radio transmitter; and
   updating the built set of neighbors, wherein the radio transmitters included in the updated set of neighbors are either from the sorted latitude-bin or from the other sorted latitude-bin.

7. The non-transitory computer storage medium of claim 6, wherein the operation of building the set of neighbors of the radio transmitter comprises:
   selecting a next radio transmitter from the sorted latitude-bin;
   responsive to a longitude-distance between the radio transmitter and the selected radio transmitter being shorter than a maximum distance between the radio transmitter and anyone of the set of neighbors, calculating a geographical distance between the selected radio transmitter and the radio transmitter;
   responsive to the calculated distance being shorter that the maximum distance, and to the set of neighbors having fewer that a predetermined number of radio transmitters, adding the selected radio transmitter to the set of neighbors;
   responsive to the calculated distance being less than the maximum distance, and to the set of neighbors having the predetermined number of radio transmitters, eliminating from the set of neighbors a radio transmitter corresponding to the maximum distance prior to adding the selected radio transmitter to the set of neighbors; and
   responsive to the longitude-distance between the radio transmitter and the selected radio transmitter being longer than the maximum distance, providing the set of neighbors for the radio transmitter.

8. The non-transitory computer storage medium of claim 7, wherein the operations further comprise:
   tagging the selected radio transmitter; and
   skipping the selected radio transmitter upon identification of the tag.

9. A system comprising:
   one or more hardware processors; and
   non-transitory computer-readable medium encoded with instructions that, when executed by the one or more hardware processors, cause the system to perform operations comprising:
      accessing a set of geographically distributed assets of known latitude and longitude; and
      generating a subset of the set of assets, the subset comprising assets located within a predetermined radial-distance from a specified geographic location, wherein the operation of generating the subset comprises:
         grouping assets from the set of geographically distributed assets in latitude-bins, each latitude-bin having a width equal to twice the predetermined radial-distance, and overlapping half of a next-to-the-North latitude-bin and half of a next-to-the-South latitude-bin;
         sorting the assets, in two latitude-bins containing the specified geographic location, by longitude-distance to the specified geographic location;
         for each sorted asset having the longitude-distance to the specified geographic location shorter than the predetermined radial-distance, calculating a geographical-distance to the specified geographic location; and
         adding to the subset an asset having the calculated geographical-distance to the specified geographic location shorter than the predetermined radial-distance.

10. The system of claim 9, wherein the operations comprise interacting with a user device through a data communication network, and
   providing to the user device the subset of assets located within the predetermined radial-distance from the specified geographic location.

11. The system of claim 10, wherein the user device comprises a mobile telephone.

12. The system of claim 9, wherein the set of geographically distributed assets comprises radio transmitters.

13. The system of claim 12, wherein the radio transmitters comprise cell tower transmitters.

14. The system of claim 12, wherein the radio transmitters comprise one or more of Wireless Fidelity (WiFi) and Worldwide Interoperability for Microwave Access (WiMAX) transmitters.

15. The system of claim 12, wherein the radio transmitters comprise cell tower transmitters and one or more of WiFi and WiMAX transmitters.

16. A system comprising:
   one or more hardware processors; and
   non-transitory computer-readable medium encoded with instructions that, when executed by the one or more hardware processors, cause the system to perform operations comprising:
      obtaining a set of geographically distributed radio transmitters of known latitude and longitude; and
      generating a subset of the set of radio transmitters, the subset comprising up to a predetermined number of radio transmitters located within a predetermined radial-distance from a specified geographic location, wherein the operation of generating the subset comprises:
         grouping radio transmitters from the set of geographically distributed radio transmitters in latitude-bins, each latitude-bin having a width equal to twice the predetermined radial-distance, and overlapping half of a next-to-the-North latitude-bin and half of a next-to-the-South latitude-bin;
         sorting the radio transmitters, in two latitude-bins containing the specified geographic location, by longitude-distance to the specified geographic location;
         for each sorted radio transmitter having the longitude-distance to the specified geographic location shorter than a maximum distance for the subset, calculating a geographical-distance to the specified geographic location, wherein the maximum distance for the subset is equal to (i) the predetermined radial-distance, if the predetermined number of radio transmitters has not been reached, or (ii) a geographical-distance corresponding to a radio transmitter of the subset that is located farthest from the specified geographic location, if the predetermined number of radio transmitters has been reached;

adding to the subset, a radio transmitter having the calculated geographical-distance shorter than the maximum distance for the subset; and responsive to the predetermined number of radio transmitters having been reached, removing from the subset the radio transmitter that is located farthest from the specified geographic location.

17. The system of claim 16, wherein the radio transmitters comprise cell tower transmitters.

18. The system of claim 16, wherein the radio transmitters comprise one or more of Wireless Fidelity (WiFi) and Worldwide Interoperability for Microwave Access (WiMAX) transmitters.

19. The system of claim 16, wherein the radio transmitters comprise cell tower transmitters and one or more of WiFi and WiMAX transmitters.

20. The system of claim 16, wherein the operations comprise interacting with a mobile telephone through a data communication network that comprises at least some of the set of geographically distributed radio transmitters, and providing to the mobile telephone the subset of assets located within the predetermined radial-distance from the specified geographic location.

\* \* \* \* \*

UNITED STATES PATENT AND TRADEMARK OFFICE
CERTIFICATE OF CORRECTION

PATENT NO.        : 8,634,856 B2
APPLICATION NO.   : 12/579376
DATED             : January 21, 2014
INVENTOR(S)       : Markus Fischer It is certified that error appears in the above-identified patent and that said Letters Patent is hereby corrected as shown below:

Title Page, Column 2 (Other Publications), Line 6, delete "Enginering," and insert therefor -- Engineering --.

Title Page, Column 2 (Other Publications), Line 7, delete "Intenrational" and insert therefor -- International --.

Title Page, Column 2 (Abstract), Line 5, after "can" delete "be".

In the Claims

Column 22, Line 19 (Claim 3), delete "that" and insert therefor -- than --.

Column 23, Line 35 (Claim 7), delete "that" and insert therefor -- than --.

Column 23, Line 37 (Claim 7), delete "that" and insert therefor -- than --.

Signed and Sealed this
Twenty-ninth Day of April, 2014

Michelle K. Lee
*Deputy Director of the United States Patent and Trademark Office*